(12) United States Patent
Sakamoto et al.

(10) Patent No.: US 7,042,539 B2
(45) Date of Patent: May 9, 2006

(54) REFLECTION PLATE, MANUFACTURING METHOD THEREOF, LIQUID CRYSTAL DISPLAY DEVICE AND MANUFACTURING METHOD THEREOF

(75) Inventors: Michiaki Sakamoto, Tokyo (JP); Yuichi Yamaguchi, Tokyo (JP); Hidenori Ikeno, Tokyo (JP); Takahiko Watanabe, Tokyo (JP); Hironori Kikkawa, Tokyo (JP); Fumihiko Matuno, Tokyo (JP)

(73) Assignee: NEC LCD Technologies, Ltd., Kanagawa (JP)

( * ) Notice: Subject to any disclaimer, the term of this patent is extended or adjusted under 35 U.S.C. 154(b) by 0 days.

(21) Appl. No.: 10/920,346

(22) Filed: Aug. 18, 2004

(65) Prior Publication Data

US 2005/0012878 A1    Jan. 20, 2005

Related U.S. Application Data

(63) Continuation of application No. 10/176,599, filed on Jun. 24, 2002, now abandoned.

(30) Foreign Application Priority Data

Jun. 22, 2001    (JP)    ............................. 2001-190264

(51) Int. Cl.
*G02F 1/1335*    (2006.01)
*G02B 13/20*    (2006.01)

(52) U.S. Cl. ........................... 349/113; 349/67; 359/599
(58) Field of Classification Search ........ 349/113–114, 349/67; 259/599
See application file for complete search history.

(56) References Cited

U.S. PATENT DOCUMENTS

| 5,128,787 | A | 7/1992 | Blonder |
| 5,973,843 | A | 10/1999 | Nakamura |
| 6,163,353 | A | 12/2000 | Ting |
| 6,181,396 | B1 | 1/2001 | Kanoh et al. |
| 6,313,895 | B1 * | 11/2001 | Tsuda et al. ................. 349/313 |
| 6,476,890 | B1 * | 11/2002 | Funahata et al. ........... 349/113 |
| 6,522,375 | B1 * | 2/2003 | Jang et al. ................... 349/113 |
| 6,525,792 | B1 * | 2/2003 | Fujioka et al. .............. 349/113 |
| 6,801,279 | B1 * | 10/2004 | Jang et al. ................... 349/113 |
| 2003/0007113 | A1 | 1/2003 | Yamanaka et al. |
| 2003/0086039 | A1 | 5/2003 | Tanada et al. |
| 2003/0142247 | A1 | 7/2003 | Nishiyama et al. |

FOREIGN PATENT DOCUMENTS

| EP | 1 205 786 A1 | 5/2002 |
| JP | 59-15279 | 1/1984 |
| JP | 3-36549 | 2/1991 |
| JP | 8-201795 | 8/1996 |
| JP | 8-227071 | 9/1996 |
| JP | 8-314114 | 11/1996 |
| JP | 9-80426 | 3/1997 |
| JP | 2825713 | 9/1998 |

(Continued)

*Primary Examiner*—Andrew Schechter
*Assistant Examiner*—Mike Qi
(74) *Attorney, Agent, or Firm*—Young & Thompson

(57) ABSTRACT

A reflection plate is formed so as to have a wavy surface, and to have uneven distribution of normal line directions of the surface in terms of a specific azimuth angle. The wavy surface is formed due to line-shaped protruding patterns and an insulation film layer. The protruding patterns intersect with one another to form concave portions each having a shape of a closed figure. The protruding patterns are formed by patterning such that they have almost uniform thickness.

6 Claims, 23 Drawing Sheets

FOREIGN PATENT DOCUMENTS

| | | |
|---|---|---|
| JP | 2955277 | 7/1999 |
| JP | 2000-9911 | 1/2000 |
| JP | 2000-105370 | 4/2000 |
| JP | 2000-250025 | 9/2000 |
| JP | 2000-284272 | 10/2000 |
| JP | A 2000-292785 | 10/2000 |
| JP | 2000-338524 | 12/2000 |
| JP | 2001-5015 | 1/2001 |
| JP | 2001-055229 | 2/2001 |
| JP | 2002-258272 | 9/2002 |
| JP | 3365409 | 11/2002 |
| KR | 2000-59471 | 10/2000 |

* cited by examiner

PROTRUDING PORTION
FORMING PORTION

CONCAVE PORTION
FORMING PORTION

REFLECTION PLATE, MANUFACTURING METHOD THEREOF, LIQUID CRYSTAL DISPLAY DEVICE AND MANUFACTURING METHOD THEREOF

CROSS-REFERENCE TO RELATED APPLICATION

This application is a continuation of Application Ser. No. 10/176,599, filed on Jun. 24, 2002 now abandoned, the entire contents of which are hereby incorporated by reference.

BACKGROUND OF THE INVENTION

1. Field of the Invention

The present invention relates to a reflection plate achieving a high contrast, a manufacturing method thereof, a liquid crystal display device, and a manufacturing method thereof.

2. Description of the Related Art

There has been known a reflection type liquid crystal display device, which reflects incident light coming from outside with a reflection plate included therein, to use the light as the light source for display. The reflection type liquid crystal display device does not require backlight as a light source. Therefore, the reflection type liquid crystal display device can be more decreased in power consumption and more thinned than a transmission type liquid crystal display device, and thus is used in portable phones, etc.

The reflection type liquid crystal display device comprises liquid crystal sealed in a liquid crystal cell, switching elements for driving the liquid crystal, and a reflection plate which is provided inside or outside the liquid crystal cell. The reflection type liquid crystal display device is an active matrix type liquid crystal display device employing thin film transistors as switching elements, for example.

A liquid crystal display device, which comprises a reflection plate on whose surface a reflection electrode having uneven patterns is formed in order to increase light to be scattered toward the normal line direction of the reflection plate (toward the viewer) and thereby to improve the contrast, is developed as a reflection type liquid crystal display device. Such a liquid crystal display device is disclosed in Japanese Patent No. 2825713, and other publications.

In this liquid crystal display device, the wavy patterns are formed by arranging a plurality of cylindrical protruding portions made of resin, under a light reflection layer. This light reflection layer is formed on the reflection plate on which the protruding patterns are formed, via an organic insulation film. As illustrated in a plan view shown in FIG. 21, the plurality of protruding patterns each having a circular-shaped cross section, are arranged on the surface of the reflection plate independently from one another. The protruding patterns having a circular-shaped cross section have a high light scattering characteristic, and reflect incident light almost uniformly toward the entire azimuth angle.

The polar angle is an angle $\phi 1$ shown in FIG. 22 measured from the normal line direction of the reflection plate, while the azimuth angle is an angle $\phi 2$ measured in the plane parallel to the reflection layer. Generally, reflection characteristics (azimuth angle, polar angle, intensity) of a reflection plate are observed by examining reflection light of incident light coming from a direction of a −30-degree polar angle.

A reflection plate acquiring a high reflection light intensity toward the direction of a 0-degree polar angle (toward the normal line direction) is demanded from a viewpoint of improving the contrast of a liquid crystal display device when it is used. However, a reflection plate having protruding patterns like the one shown in FIG. 21 reflects light almost uniformly toward the entire azimuth angle. Accordingly, the relationship between the polar angle and the reflection light intensity shows a state similar to normal distribution, as shown by a graph of FIG. 23. Therefore, there has existed a limit on how much the reflection light intensity can be improved toward the direction of the 0-degree polar angle, with the use of such protruding patterns having a circular-shaped cross section.

Not only the reflection type liquid crystal display device, but a so-called semi-transparent liquid crystal display device, such as disclosed in Japanese Patent No. 2955277, has the same problem. This liquid crystal display device comprises pixel electrodes having a transparent region and a reflection region, and a reflection plate, and thus has both of the transmission function and the reflection function. As having the reflection plate, this type of liquid crystal display device cannot avoid the same problem.

SUMMARY OF THE INVENTION

In view of the above circumstance, an object of the present invention is to provide a reflection plate achieving a high contrast, a manufacturing method thereof, a liquid crystal display device, and a manufacturing method thereof.

Another object of the present invention is to provide a reflection plate which can reflect light efficiently toward the normal line direction of the reflection plate, a manufacturing method thereof, a liquid crystal display device, and a manufacturing method thereof.

To achieve the above objects, a reflection plate according to a first aspect of the present invention has concave and protruding portions on a surface thereof, wherein:

distribution of normal line directions on the surface is uneven in terms of a specific azimuth angle; and reflection light intensity is dependent upon azimuth angle.

Distribution of reflection light intensity in relation to polar angle at the specific azimuth angle may show one or more local maximum values, other than a normal reflection component.

Closed figures may be formed by the protruding portions of the concave and protruding portions.

The concave portions of the concave and protruding portions may be enclosed by the closed figures.

The closed figures may be a polygon.

The polygon may be approximately a triangle, or approximately a trapezoid.

The polygon may be approximately a triangle having a flattening ratio of equal to or greater than 0.5 and equal to or smaller than 0.8.

In each of the closed figures, its length in a first direction in which reflection light intensity becomes the largest, may be smaller than its length in a second direction which is perpendicular to the first direction.

Line shapes formed by the protruding portions of the closed figures may have almost uniform width.

The line shapes formed by the protruding portions of the closed figures may have almost uniform thickness.

A liquid crystal display device according to a second aspect of the present invention has the reflection plate described above.

In this case, when incident light is radiated to a display surface of the liquid crystal display device from a direction of −30-degree polar angle, the reflection light intensity may reach local maximum in a range of polar angle of 0 to 10 degrees.

When incident light is radiated to the display surface of the liquid crystal display device from a direction of −30-degree polar angle, the reflection light intensity may have a positive slope in relation to polar angle in a range of polar angle of 10 to 20 degrees, the slope may become smaller as polar angle becomes larger in a range of polar angle of 10 to A degrees (10<A<20), and the slope may become larger as polar angle becomes larger in a range of polar angle of A to 20 degrees.

A method of manufacturing a reflection plate according to a third aspect of the present invention comprises:

coating an organic resin on a substrate, patterning the organic resin with a line-shape mask, and thus forming a plurality of line-shaped protruding patterns such that the protruding patterns intersect with one another to form concave portions each having a shape of a closed figure; and coating an interlayer film so as to cover the line-shaped protruding patterns.

The line-shape mask may comprise mask lines whose width at and about intersection portions of the mask lines is narrower than that of portions other than the intersection portions.

A method of manufacturing a reflection plate according to a fourth aspect of the present invention comprises forming a contact hole portion, and at a same time, concave and protruding portions including a plurality of line-shaped protruding portions which intersect with one another, and concave portions enclosed by the protruding portions, by coating an organic resin on a substrate, and exposing and developing the organic resin by changing luminous exposure.

The patterning of the contact hole portion and the concave and protruding portions may include exposing the organic resin using different masks and by different luminous exposures for the two different portions.

Luminous exposure of the organic resin for patterning the concave and protruding portions may be 10 to 50% of luminous exposure of the organic resin for patterning the contact hole portion.

The patterning of the contact hole portion and the concave and protruding portions may include exposing the organic resin by using a half tone mask having different light transmittance for the contact hole portion and the concave and protruding portions, respectively.

A mask for forming the line-shaped protruding portions may comprise mask lines whose width at and about intersection portions of the mask lines is narrower than that of portions other than the intersection portions.

A method of manufacturing a liquid crystal display device according to a fifth aspect of the present invention comprises forming a reflection plate in accordance with the manufacturing method described above.

BRIEF DESCRIPTION OF THE DRAWINGS

These objects and other objects and advantages of the present invention will become more apparent upon reading or the following detailed description and the accompanying drawings in which.

DETAILED DESCRIPTION OF THE PREFERRED EMBODIMENTS

An embodiment of the present invention will be explained below with reference to the drawings. The embodiment to be described below is one embodiment of the present invention, and not intended to limit the scope of the present invention.

First Embodiment

A reflection type liquid crystal display device according to this embodiment is an active matrix type liquid crystal display device having a switching element such as a thin film transistor (TFT) in each pixel.

Figure 1:
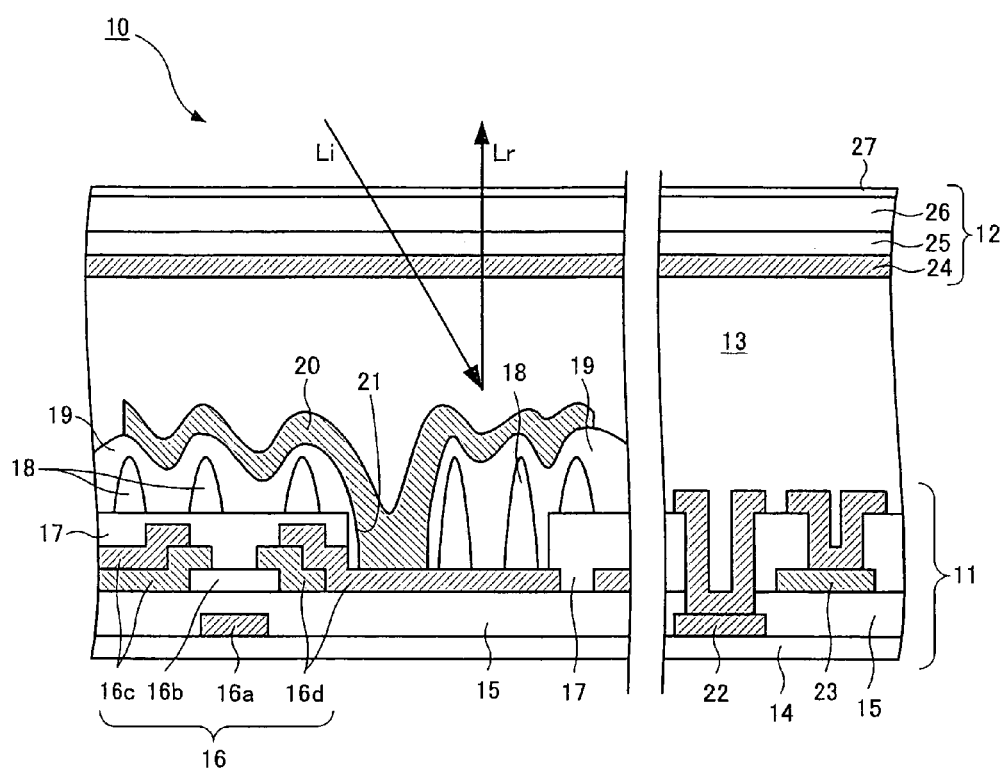
FIG. 1 is a diagram showing the cross section of a reflection type liquid crystal display device according to an embodiment of the present invention.

FIG. 1 is a cross section of a unit pixel area of the reflection type liquid crystal display device according to this embodiment. As shown in FIG. 1, the reflection type liquid crystal display device 10 comprises a lower substrate 11, an opposing substrate 12 which is set opposite from the lower substrate 11, and a liquid crystal layer 13 which is sandwiched between the lower substrate 11 and the opposing substrate 12.

The lower substrate 11 includes an insulation substrate 14, an insulation protection film 15, a TFT 16, a first insulation layer 17, protruding patterns 18, a second insulation layer 19, and a reflection electrode 20.

The insulation protection film 15 made of an inorganic or organic insulation material is deposited on the insulation substrate 14. The TFT 16 which serves as a switching element is formed on the insulation protection film 15.

The TFT 16 comprises a gate electrode 16a formed on the insulation substrate 14, a semiconductor layer 16b which is laid just above the gate electrode 16a via the insulation protection film 15, and a drain electrode 16c and a source electrode 16d respectively connected to a drain area and a source area in a non-illustrated semiconductor layer.

Transistors other than a TFT, a diode such as MTM may be used as the switching element.

The First insulation layer 17 is made of an inorganic or organic insulation material, and is formed to have predetermined patterns on the insulation protection film 15 on which the TFT 16 is formed.

The protruding patterns 18 are made of a resin material, and are formed on the first insulation layer 17 and the source electrode 16d. The protruding patterns 18 are formed into a plurality of line-shaped patterns, as will be described later.

The second insulation layer 19 is formed to cover the protruding patterns 18. The second insulation layer 19 is made of a resin material. A contact hole 21, at the bottom of which the source electrode 16d is exposed, is formed in the second insulation layer 19. The surface of the second insulation layer 19 is wavy (uneven) due to the protruding patterns 18 thereunder.

The reflection electrode 20 is made of a conductive material such as aluminum, and is formed on the second insulation layer 19 including the contact hole 21. The reflection electrode 20 is connected to the source electrode 16d of the TFT 16 through the contact hole 21, so as to function as a pixel electrode and a light reflection layer. The surface of the reflection electrode 20 is also wavy, due to the protruding patterns 18 and the second insulation layer 19.

In a terminal area around the periphery of the lower substrate 11, a gate terminal 22 is formed on the insulation substrate 14, and a drain terminal 23 is formed on the insulation protection film 15 which covers the gate terminal 22.

The opposing substrate 12 includes a color filter 25 and a transparent electrode 24 which are sequentially deposited on one surface of a transparent insulation substrate 26. A polarizing plate 27 is formed on the other surface of the insulation substrate 26.

The liquid crystal layer 13 is formed using a TN (Twisted Nematic) method, an STN (Super Twisted Nematic) method, a one polarizing plate method, a GH (Guest Host) method, a PDLC (Polymer Dispersed Liquid Crystal) method, a cholesteric method, or the like. The liquid crystal layer 13 is provided with a predetermined orientation.

The operation of the reflection type liquid crystal display device 10 having the above described structure will now be explained.

In a white mode, incident light Li coming from outside of the opposing substrate 12 through the polarizing plate 27 goes through the insulation substrate 26, the color filter 25, the transparent electrode 24, and the liquid crystal layer 13, and finally reaches the surface of the reflection electrode 20.

The surface of the reflection electrode 20 is wavy due to the protruding patterns 18, thus the incident light Li is reflected in accordance with a directivity influenced by the waves. The reflection light Lr returns to the outside as display light, going back through the liquid crystal layer 13, the transparent electrode 24, the color filter 25, the insulation substrate 26, and the polarizing plate 27.

On the contrary, in a black mode, although the incident light Li coming from outside of the opposing substrate 12 is reflected on the reflection electrode 20 likewise in the white mode, the reflected light is prevented by the polarizing plate 27 from being externally emitted. In this way, the reflection type liquid crystal display device 10 is switched ON and OFF.

Figure 2A:
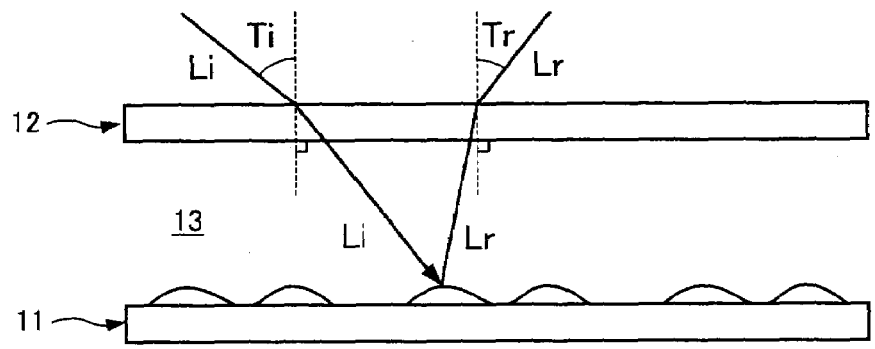
FIGS. 2A and 2B are diagrams illustrating light to be reflected.

The distributions of reflection direction and reflection light intensity of the reflection light Lr depend upon the distributions of tilt angle and normal line direction of the wavy surface patterns formed on the surface of the reflection electrode 20. FIG. 2A is a diagram exemplarily showing the incident light Li, and the reflection light Lr to be perceived by the viewer. The angles respectively formed by the incident light Li from the light source and the light Lr reflected on the opposing substrate 12 with respect to the normal line direction of the opposing substrate 12 are defined incident angle Ti and reflection angle Tr, respectively. Since the incident light Li is reflected on the wavy surface of the reflection electrode 20, the incident angle Ti and the reflection angle Tr take different values.

Figure 2B:
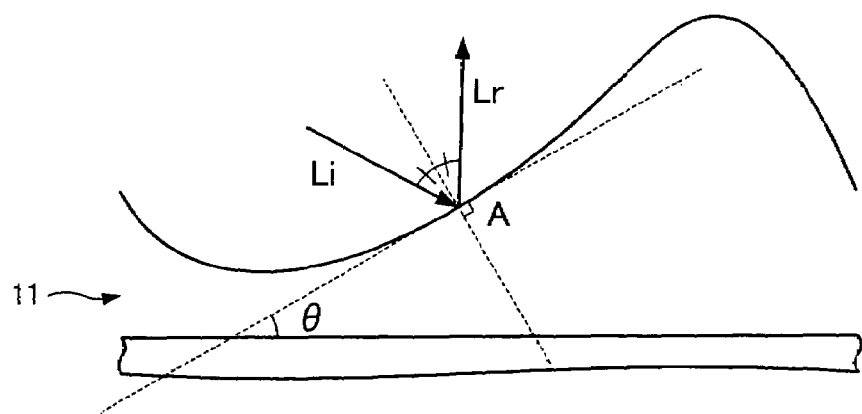

FIG. 2B is a diagram exemplarily showing reflection of the incident light Li' coming to a point A which exists on wavy surface of the reflection electrode 20. In the case where the incident light Li' comes to the point A, the light is reflected on the contact plane at the point A of the reflection electrode 20. Thus, the reflection light Lr' is reflected in a direction determined by the normal line direction at the point A as a symmetry axis to have the same angle as that of the incident light Li' with respect to the symmetry axis. Here, it is assumed that an angle formed by the contact plane of the reflection electrode 20 at the point A and the lower substrate 11 is defined as a tilt angle $\theta$ at the point A. The distributions of reflection direction and reflection light intensity of the reflection light Lr depend upon the distributions of the tilt angle $\theta$ and normal line direction of the convex and concave patterns of the reflection electrode 20.

Next, a method of manufacturing the above described reflection type liquid crystal display device 10 will be explained. FIGS. 3A to 3F are explanatory diagrams showing manufacturing steps of the reflection type liquid crystal display device 10 shown in FIG. 1, or the lower substrate 11 in particular.

Figure 3A:
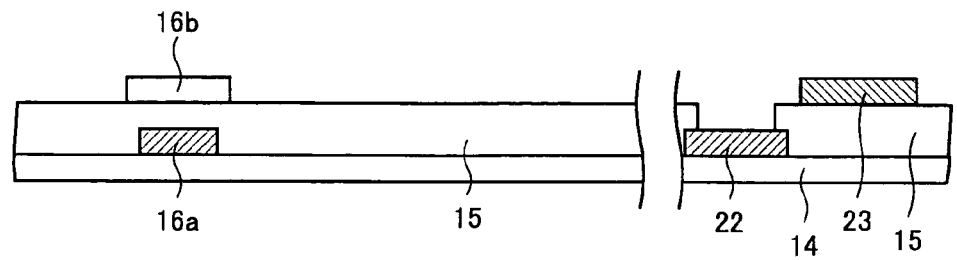
FIGS. 3A to 3F are diagrams showing steps of manufacturing a lower substrate shown in FIG. 1.
Figure 3B:
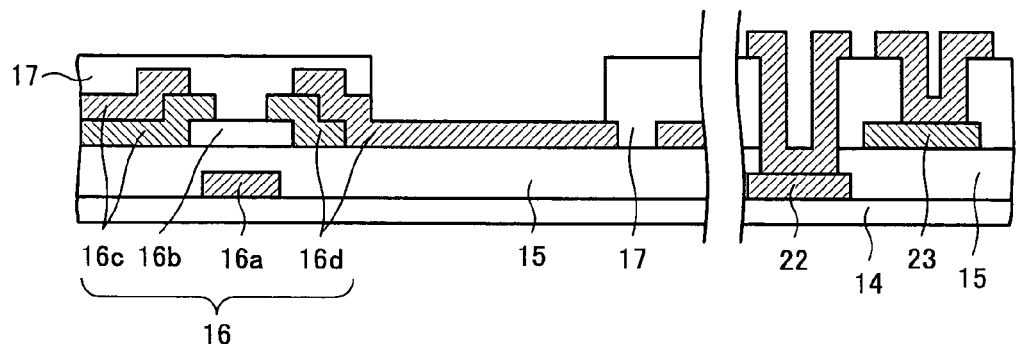

The TFT 16 serving as a switching element is formed on the insulation substrate 14 first. Specifically, the gate electrode 16a is formed on the insulation substrate 14, and then the insulation protection film 15 is formed so as to cover the insulation substrate 14 and the gate electrode 16a. Next, the semiconductor layer 16b having a drain area and source area (not illustrated) is formed on the insulation protection film 15 by etching, impurity implantation, etc. (FIG. 3A). Then, the drain electrode 16c and the source electrode 16d which are to be connected respectively to the drain area and the source area are formed on the insulation protection film 15. Further, the first insulation layer 17 is formed on the TFT 16 (FIG. 3B).

Figure 3C:
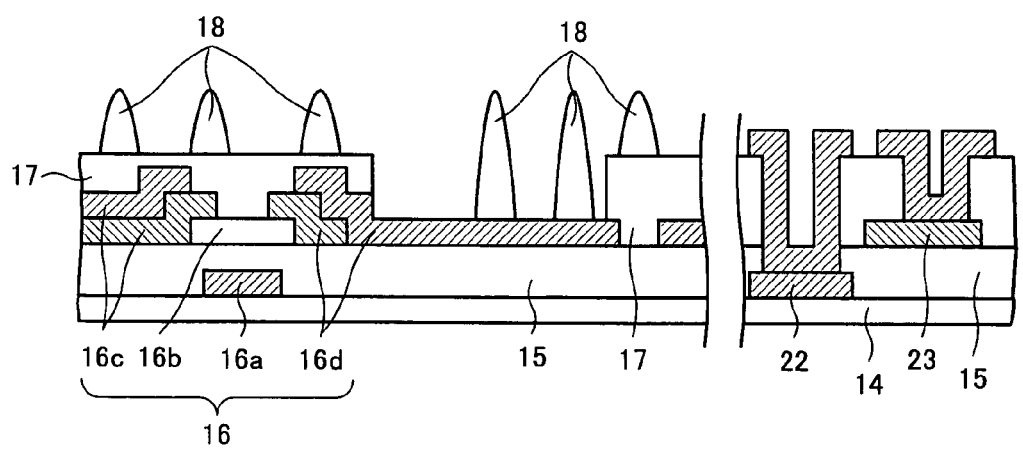
Figure 3D:
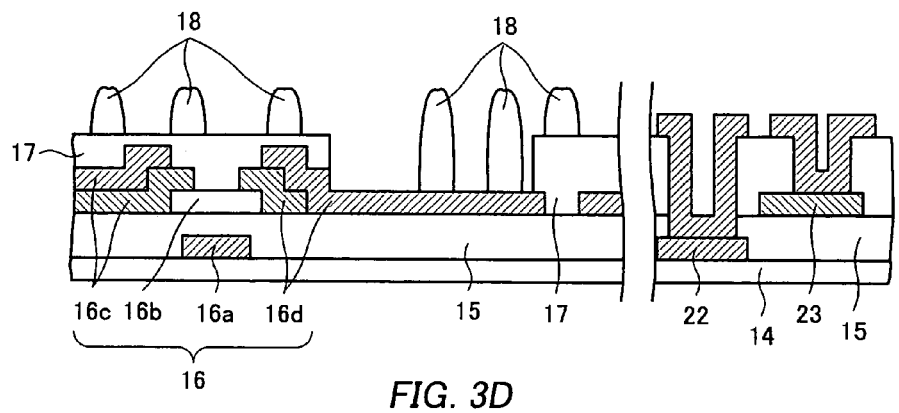

Then, after organic resin is coated on the first insulation layer 17, the resin is patterned using a predetermined photolithography technique and an etching technique. By this patterning, the protruding patterns 18 are formed, as shown in FIG. 3C. After the patterning, a baking process is applied to the protruding patterns 18. The shapes of the protruding patterns 18 are rounded by the baking process, as shown in FIG. 3D.

Figure 4:
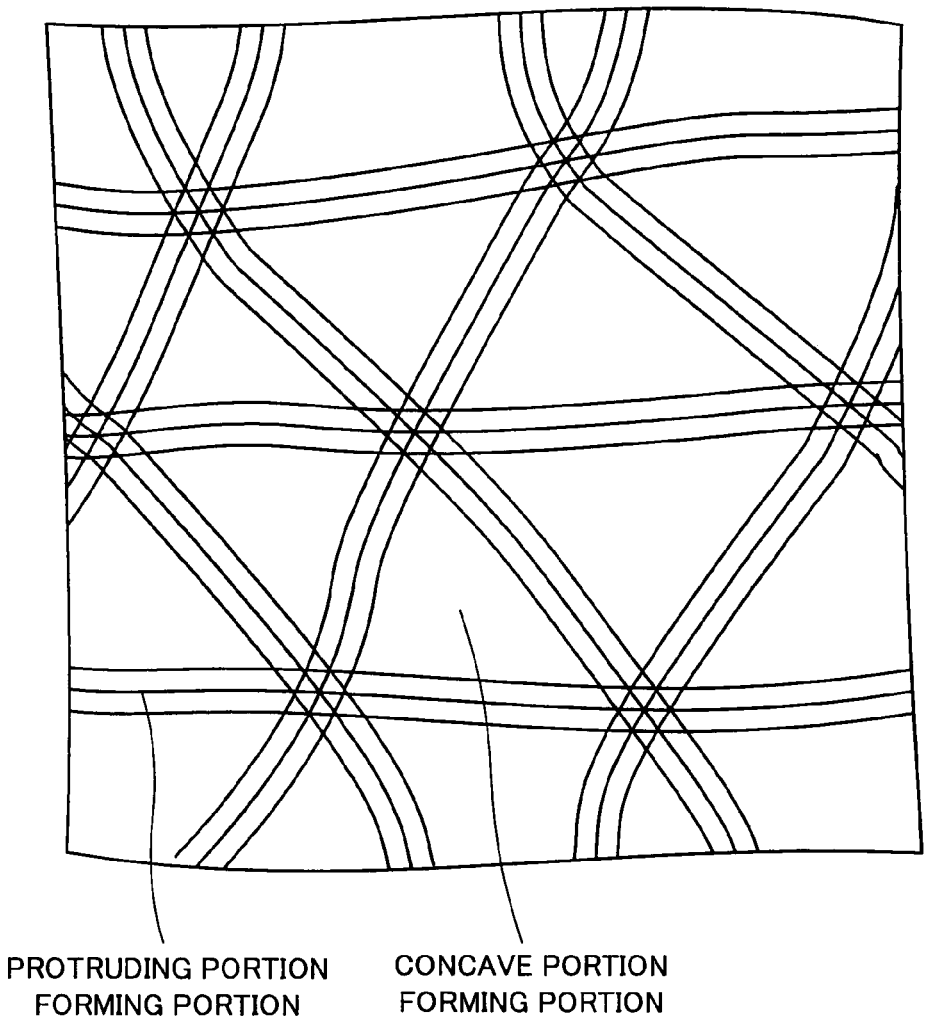
FIG. 4 is a diagram showing a mask pattern.

The protruding patterns 18 are formed into a shape of line. Adjacent protruding patterns 18 form a concave portion having a shape of a basic figure, especially, a closed figure such as a triangle. The formation of the line-shaped protruding patterns 18 is carried out with the use of a mask pattern as shown in FIG. 4. A reflection plate having such line-shaped protruding patterns 18 is disclosed in the Japanese Patent Application No. 2001-55229 filed by the applicant of the present patent application.

By forming the line-shaped protruding patterns 18 so as to form a concave portion having a shape of a basic figure, the reflection electrode 20 to be formed in a later step will have concave and protruding portions of a predetermined shape on its surface. As a result, there will be provided the lower substrate 11, which achieves reflection light intensity that depends upon the azimuth angle, and which enables a highly directional light reflection with increasing the light to be reflected toward a specific direction.

Figure 5A:
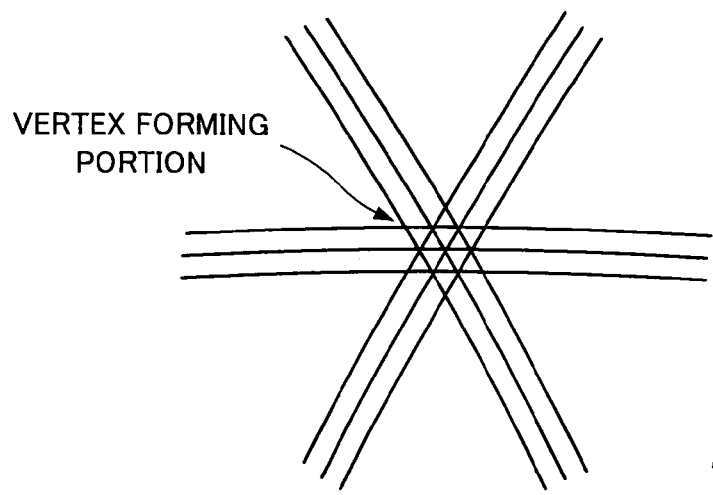
FIGS. 5A to 5C are expanded diagrams of an intersection of a mask pattern.
Figure 5B:
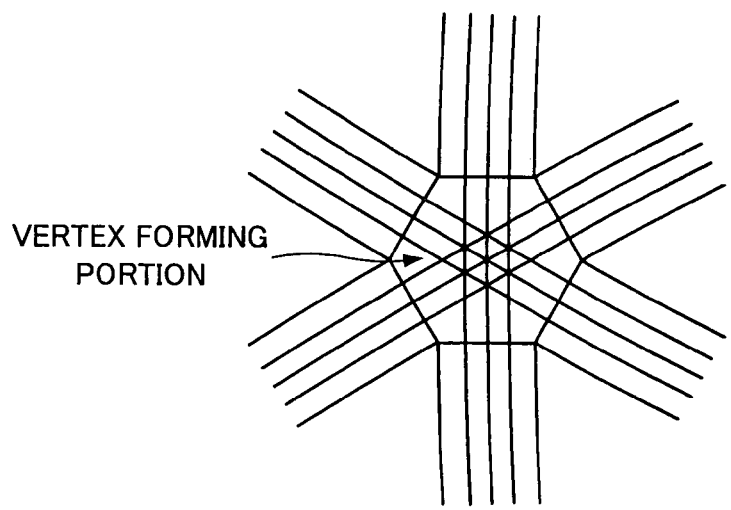
Figure 5C:
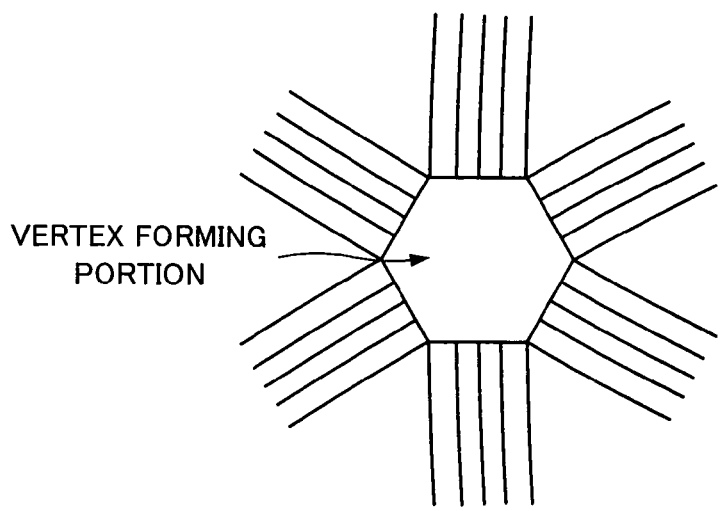

In the mask pattern shown in FIG. 4, the pattern of an intersection (shown in FIG. 5A) of some line-shaped protruding portion forming portions may be replaced with modified mask patterns shown in FIGS. 5B and 5C. With the use of such modified mask patterns, it is possible to reduce the difference in film thickness between the vertex and side of the basic figure.

Figure 6A:
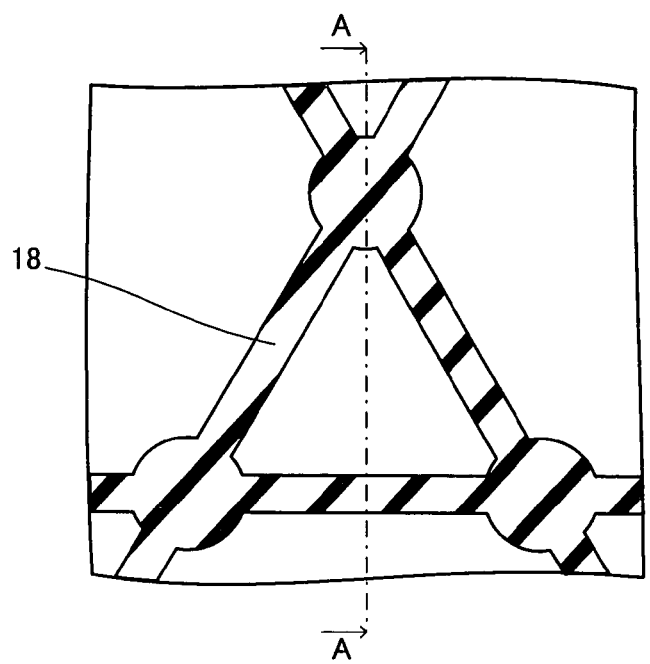
FIG. 6A is an expanded diagram of a basic figure, and FIGS. 6B to 6D arc cross sections of FIG. 6A when it is cut along a line A—A.
Figure 6B:
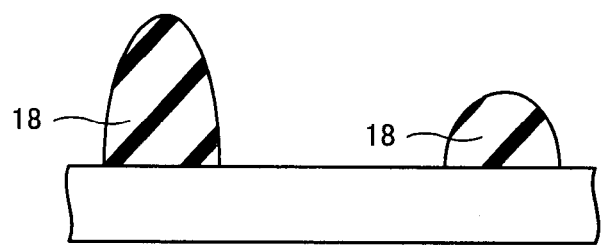

In the case where the protruding patterns are formed using the mask pattern shown in FIG. 5A, the vertexes of the basic figure (triangle) will become broadened and rounded as shown in FIG. 6A, due to an error in the resolution of exposure and the resolution of a resist. Further, as shown in a cross section shown in FIG. 6B along a line A—A of FIG. 6A, heights (film thickness) of the patterns will not be uniform, such that the vertex portion is higher than the side portion.

Figure 6C:
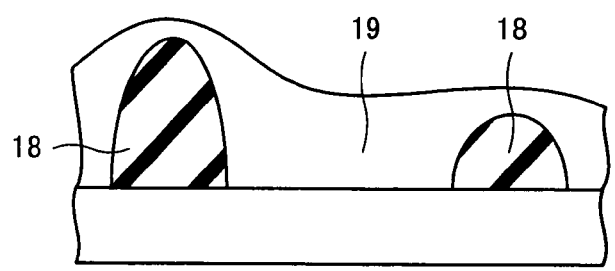
Figure 6D:
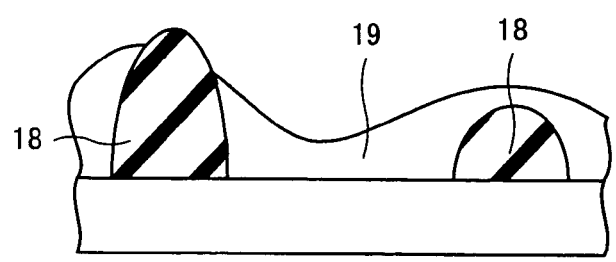

In the case where the second insulation layer 19 is deposited on the protruding patterns 18 where the heights of the vertex portions and the side portions are not uniform, if the areas around the vertex portions are designed to be provided with appropriate tilt angles, the second insulation layer 19 may be flat in the areas near the side portions (FIG. 6C). On the other hand, if the areas near the side portions are designed to be provided with appropriate tilt angles, the vertex portions may project from the second insulation layer 19 (FIG. 6D). Therefore, if there is difference in the heights of the protruding patterns 18, efficient light reflection cannot be obtained, and unevenness of light reflection may be caused.

In the mask pattern shown in FIG. 5B, the protruding portion forming portions have, at the intersection thereof, narrower width of line. For example, in the mask pattern shown in FIG. 5A, the line width of the protruding portion forming portions is set to about 4 μm along the entire line, while in the mask pattern shown in FIG. 5B, the line width is set to about 2 μm at and near the intersections. In the mask pattern shown in FIG. 5C, the lines are removed at and near the intersections. By narrowing the line width of the protruding patterns 18 at the vertex portions, or by removing the lines at the vertex portions, it is possible to reduce or eliminate the unevenness in the height (film thickness) between the vertexes and sides of the basic figure. Accordingly, efficient light reflection can be obtained.

Figure 3E:
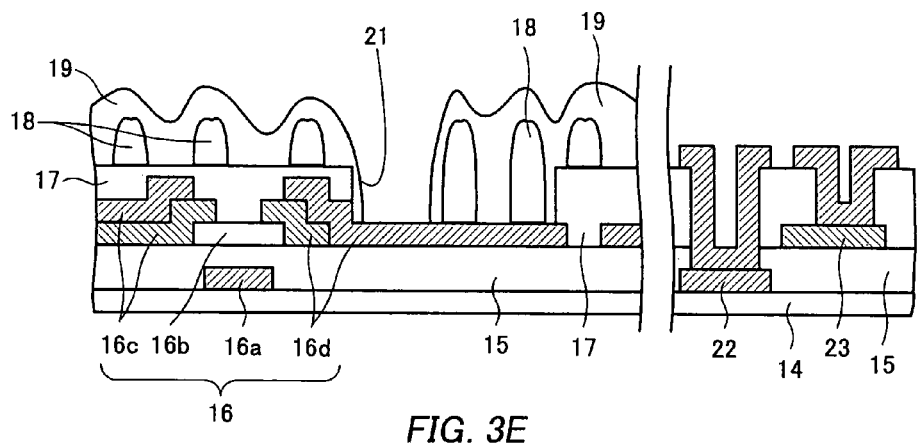

The explanation will return to FIG. 3D. Successively, an interlayer film made of organic resin is coated over the protruding patterns 18 so that the surface becomes mildly wavy. Then, the contact hole 21 is opened using a photolithography technique. Afterwards, baking is applied to the interlayer film to form the second insulation layer 19 (FIG. 3E).

Figure 3F:
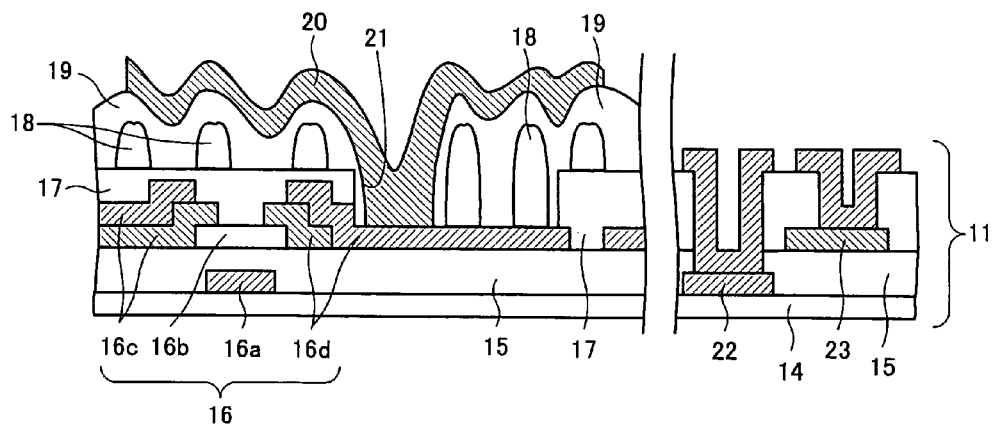

Then, an aluminum (Al) thin film is formed on the second insulation layer 19 including the contact hole 21. After this, the reflection electrode 20 as a reflection pixel electrode is formed by patterning (FIG. 3F). Thus, the lower substrate 11 as a reflection plate is completed.

Spacers (not illustrated) are placed between thus formed lower substrate 11 and the opposing substrate 12 formed by depositing the color filter 25, etc. on the insulation substrate 26. A space (cell) formed by the spacers is filled with resin and sealed. Thereafter, the polarizing plate 27 is adhered onto the surface of the opposing substrate 12 to complete the reflection type liquid crystal display device 10 shown in FIG. 1.

As described above, in the reflection type liquid crystal display device 10 having the above structure including the line-shaped protruding patterns 18, the reflection light intensity depends upon the azimuth angle, and thus light to be reflected toward a specific direction can be increased.

FIG. 7 shows a result of a research to test the azimuth angle and reflection light intensity when light is radiated on the lower substrate 11 (reflection plate) having the above structure, from a direction of −30-degree polar angle. Here, the polar angle is the angle φ1 shown in FIG. 22 measured from the normal line direction of the reflection plate, and the azimuth angle is the angle φ2 measured in the plane parallel to the reflection layer.

When considering an ordinary usage situation of a liquid crystal display device, it can be considered that when incident light Li is radiated onto the display surface from a direction of −30 degree polar angle (0 degree azimuth angle), the viewer best perceives light Lr reflected from a direction of 0 to 20 degree polar angle (180 degree azimuth angle), preferably from direction of 0 to 10 or 10 to 20 polar angle (180 degree azimuth angle). Accordingly, high contrast may be realized on a liquid crystal display device having a reflection plate which reflects light Lr in the above direction more than the other directions, when incident light Li is radiated from the above described direction.

Figure 7A:
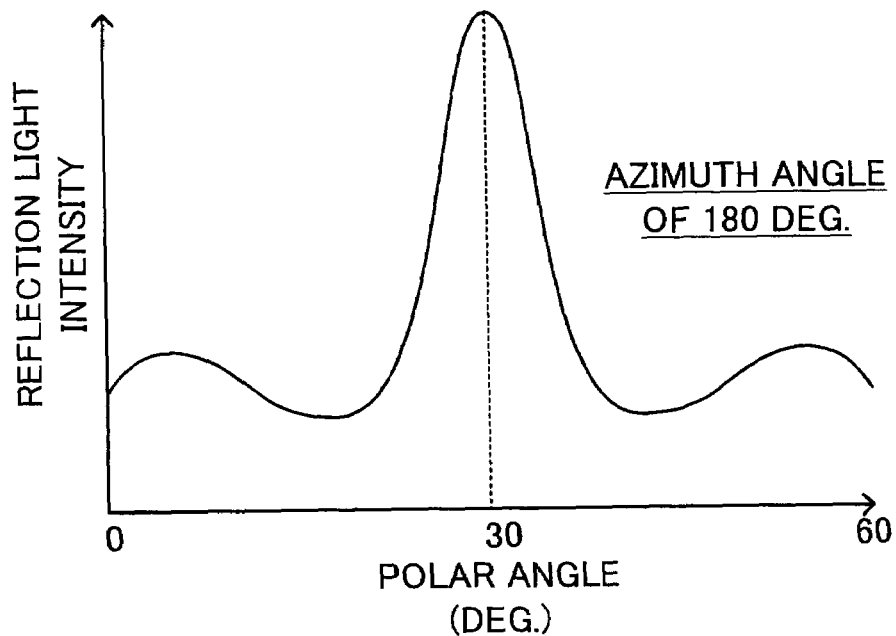
FIGS. 7A and 7B are graphs showing the relationship between reflection light intensity and azimuth angle and polar angle, regarding a reflection plate according to the embodiment.
Figure 7B:
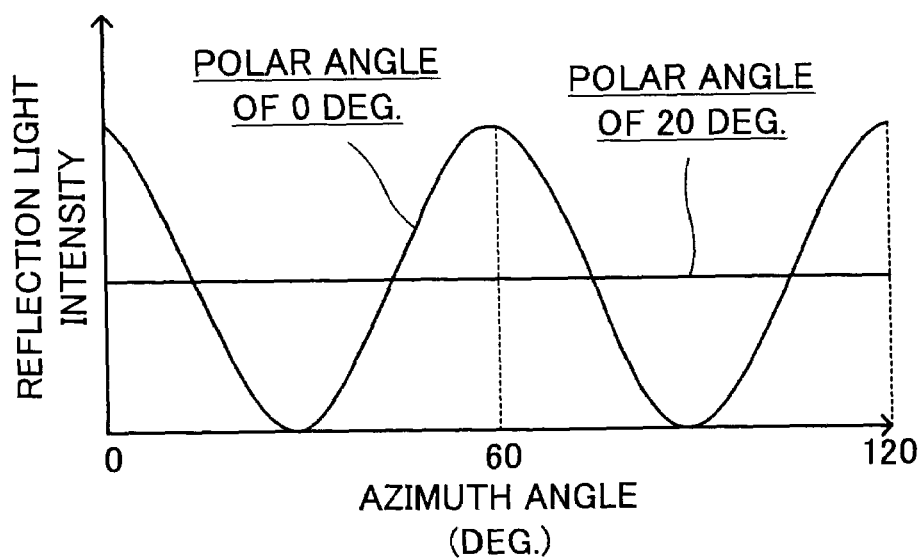
Figure 22:
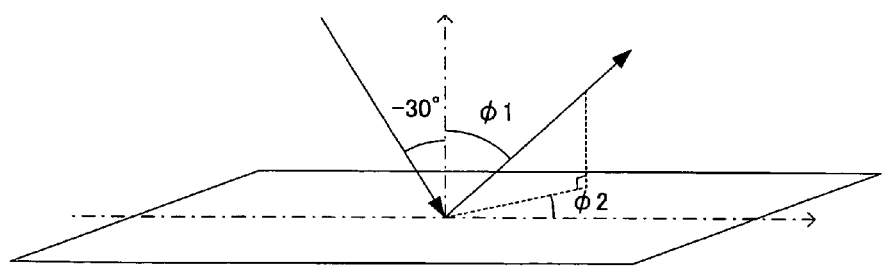
FIG. 22 is a diagram for explaining a polar angle and an azimuth angle.
Figure 23:
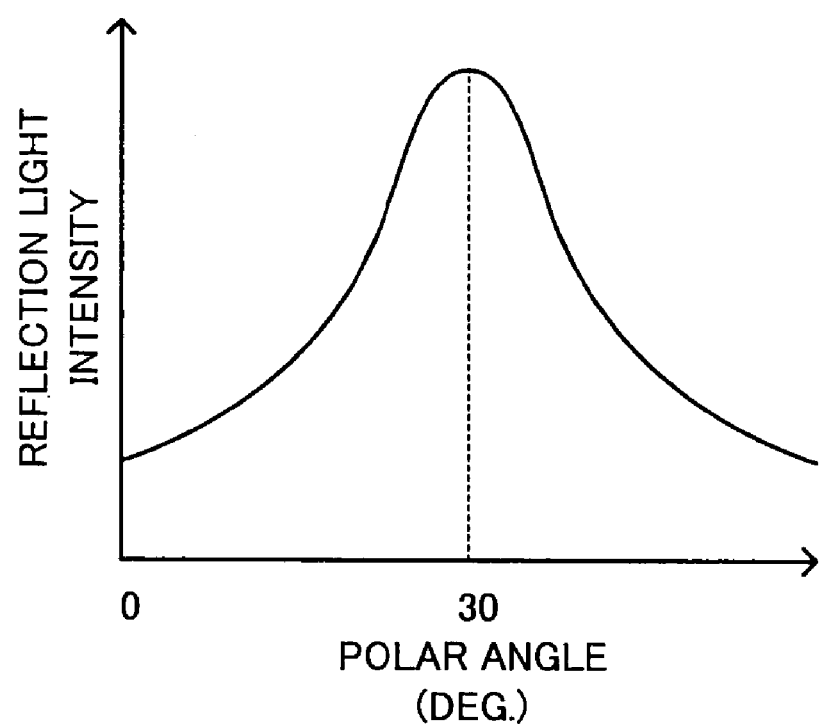
FIG. 23 is a graph showing the relationship between polar angle and reflection light intensity in a case where the protruding patterns shown in FIG. 21 are used.

FIG. 7A and FIG. 7B respectively show the relationship between polar angle and reflection light intensity and the relationship between the azimuth angle and reflection light intensity, which are obtained when light is radiated to the lower substrate 11 (reflection plate) having the above described structure from a direction of −30 degree polar angle. As shown in FIG. 22, the polar angle is an angle φ1 measured from the normal line direction of the reflection plate, and the azimuth angle is an angle φ2 measured in the plane parallel to the reflection plate.

Figure 8:
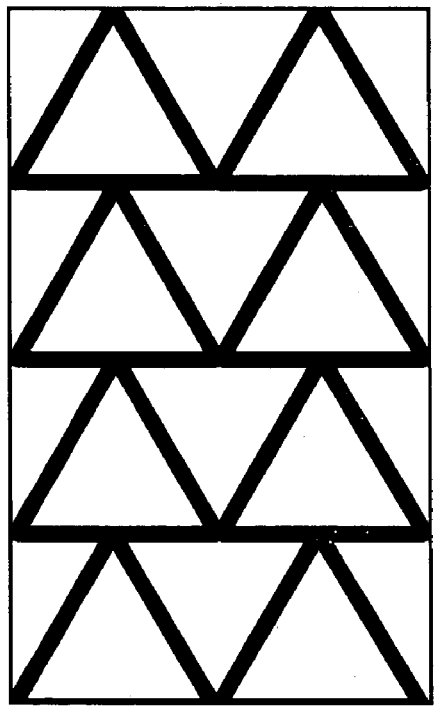
FIG. 8 shows a protruding pattern having an equilateral triangle basic figure.

Closed figure patterns made of equilateral triangle basic figures are formed on the lower substrate 11, as shown in FIG. 8.

As shown in FIG. 7A, the reflection light intensity shows a peak near the polar angle of 0 to 10 degrees, other than in the normal reflection direction (polar angle of 30 degrees). As shown in FIG. 7B, the reflection light intensity changes regularly, in response to the change of azimuth angle. Especially, the reflection light intensity shows peaks at the polar angles of 0 degree, 60 degrees, and 120 degrees. And as the polar angle becomes larger, for example, from 10 degrees to 20 degrees, the peak becomes lower.

The reason why the reflection light intensity becomes stronger toward a direction of a specific angle is that there is unevenness in the distribution of normal line directions on the wavy surface of the lower substrate 11.

It can be considered that the reflection characteristic near the polar angle of 0 to 10 degrees is mainly caused by the side portions of the triangles, and the reflection characteristic of the component near the normal reflection equal to or larger than 20 degrees is due to the flat portion near the center of the triangles. Accordingly, it can be considered that it is effective to increase the number of sides orthogonal to the measuring direction, in order to improve the reflectivity near the polar angle of 0 to 30 degrees when the azimuth angle is at 180 degrees (when the azimuth angle faces toward the front).

EXAMPLE 1

Figure 9:
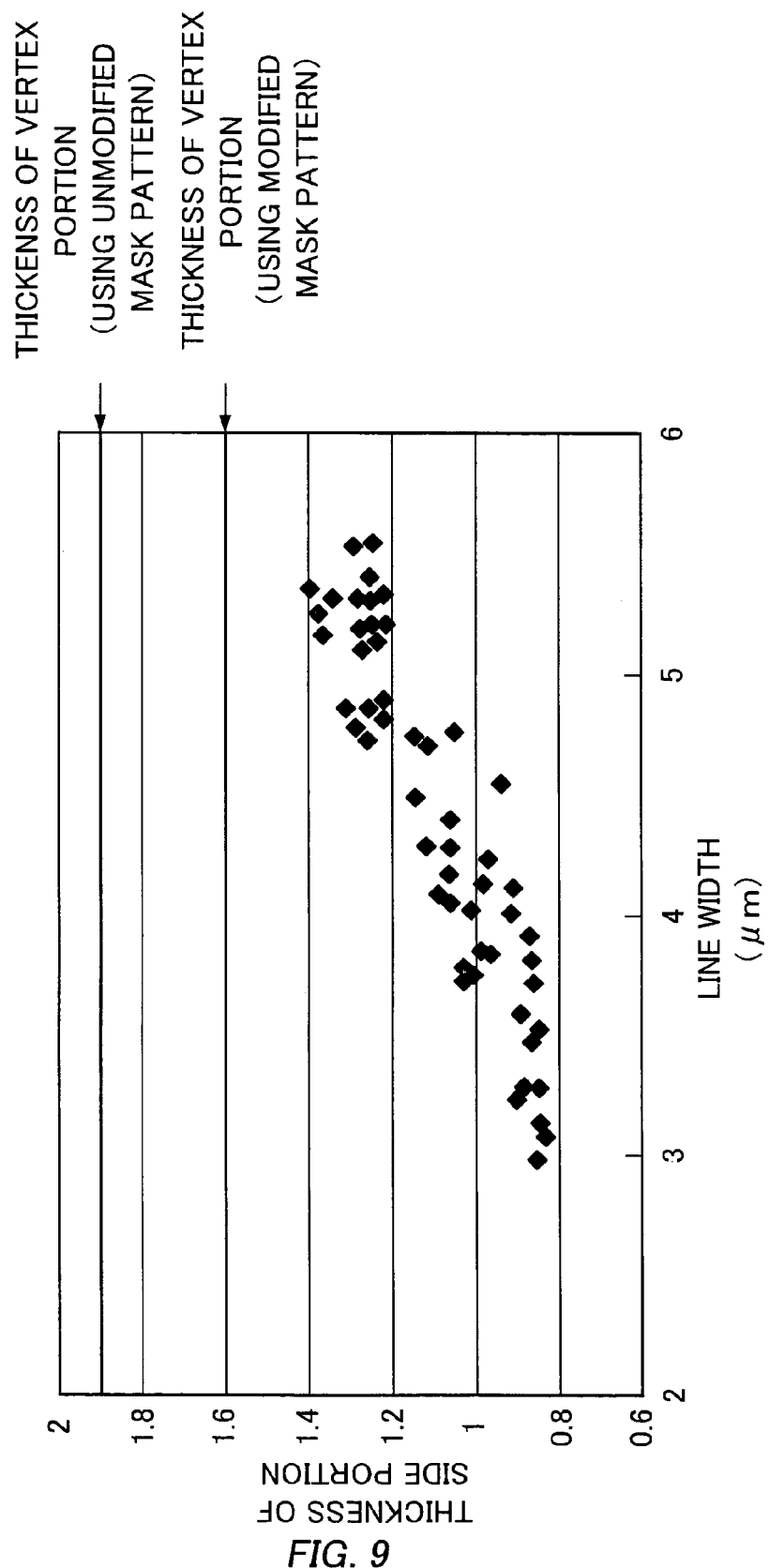
FIG. 9 is a graph showing the relationship between line width and thickness of side.

FIG. 9 shows the relationship between the line width of the basic figure (triangle) and the thickness of the vertex and side portions, in a case where the basic figure is formed by coating a resin film having 2.35 μm thickness, patterning the film with the use of the mask patterns shown in FIGS. 5A and 5B, and baking the film.

As shown in FIG. 9, in the case of using the unmodified mask pattern shown in FIG. 5A, the thickness of the vertex portion is 1.90 μm. On the other hand, in the case of using the mask pattern shown in FIG. 5B where the line width at the intersection is narrowed, the thickness of the vertex portion is 1.60 μm. It is turned out from this result that in the case where the modified mask pattern is used, difference in the thickness between the vertex and the side can be reduced.

Further, it is apparent that the larger the line width becomes, the thicker the side portion becomes. Therefore, it can preferably be said that the larger the line width of the side portion is, the smaller the difference in the thickness between the side portion and the vertex portion becomes. Especially, it is apparent that the line width should be preferably set to about 5 μm, so that the thickness of the side portion can be about 1.3 μm.

EXAMPLE 2

Light is radiated from a direction of −30-degree polar angle onto the lower substrate 11 in which the protruding patterns 18 are formed so as to constitute triangle-shaped concave portions, in order to measure the relationship between polar angle and reflection light intensity at an azimuth angle of 180 degrees, which is counter to the light source.

In this measurement, a spectrophotometer IMUC (LCD7000) made by Otsuka Electronics Co., Ltd. is used. Further in this measurement, the incident light is caused to be radiated onto one vertex of the triangle, which is the basic figure. And the spectrophotometer is placed horizontally to one side of the triangle. The measurement result at the 180-degree azimuth angle is shown in FIG. 10.

Figure 10:
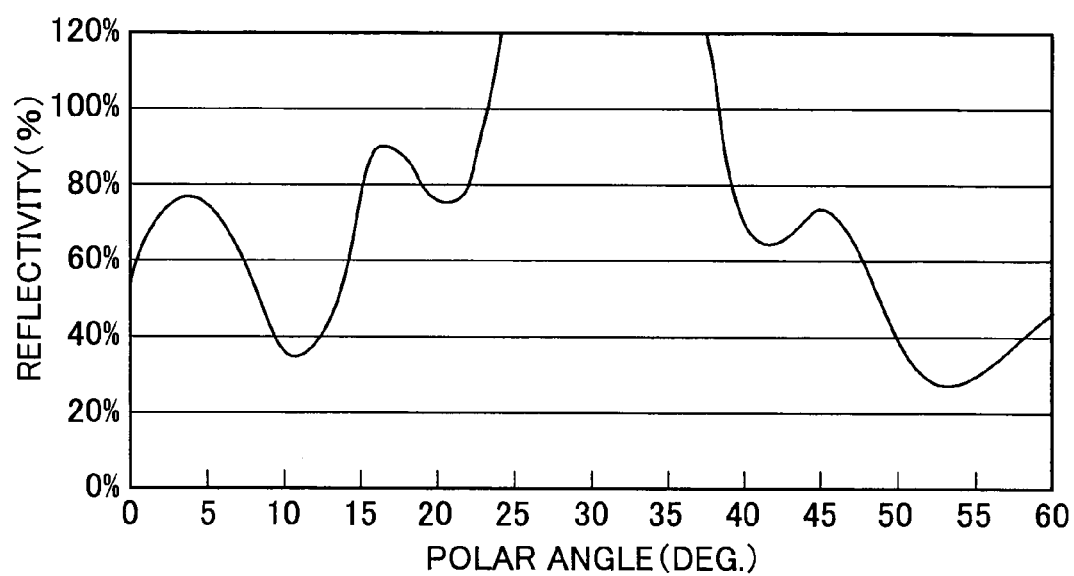
FIG. 10 is a graph showing the relationship between polar angle and reflectivity at an azimuth angle of 180 degrees.

It is apparent from the result shown in FIG. 10 that the reflection light intensity (reflectivity) reaches local maximum twice near the polar angle of 30 degrees and the polar angle of 5 degrees. The fact that alternation of the reflection light intensity shows a plurality of local maximum values in accordance with the polar angle, proves the fact that the lower substrate 11 has the directivity shown in FIGS. 7A and 7B, regarding the azimuth angle.

The reflection light intensity at the 0-degree polar angle is stronger than the reflection light intensity at the 90-degree azimuth angle (not shown by the data). The reason for this is considered to be that in case of the 180-degree azimuth angle, local maximum of the reflection light intensity appears near the 5-degree polar angle, due to azimuth-angle-dependent light reflection as shown in FIGS. 7A and 7B. The reflection light intensity at the 0-degree polar angle can be strengthened if the local maximum of the reflection light intensity appears near 0 to 10 degrees.

EXAMPLE 3

In order to maximize the reflection light intensity at an azimuth angle of 180 degrees and at a polar angle of 0 degree, parameters with regard to the protruding patterns 18 will be considered.

EXAMPLE 3-1

Figure 11A:
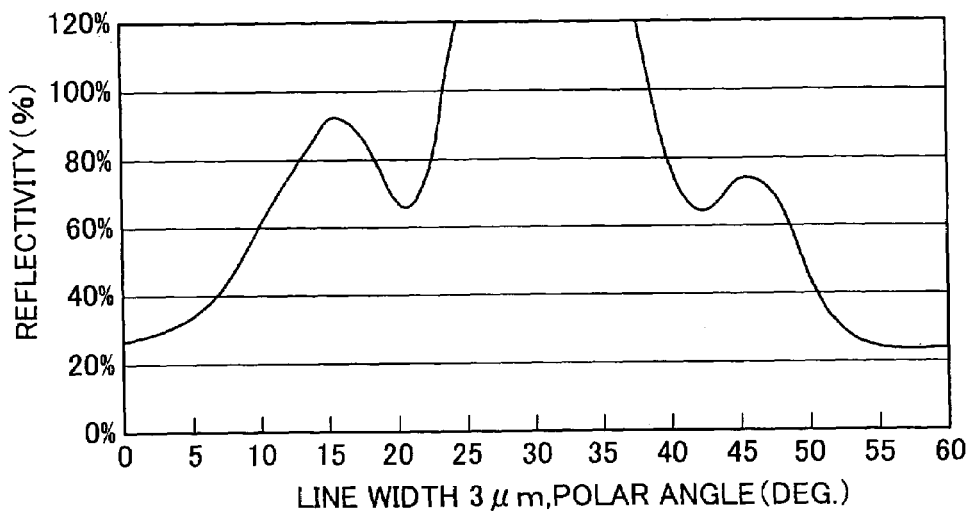
FIGS. 11A and 11B are graphs showing the relationship between polar angle and reflectivity in a case where line width is varied.
Figure 11B:
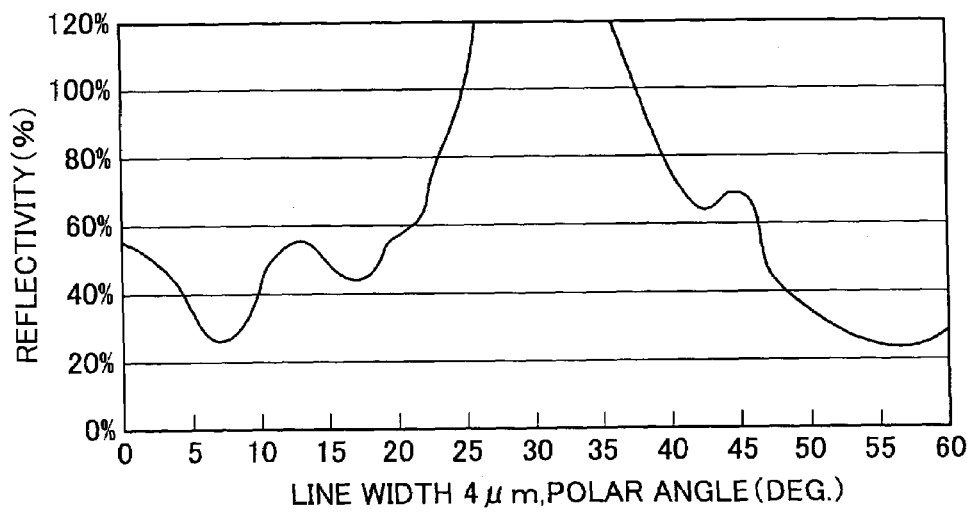

FIGS. 11A and 11B respectively show results of measuring the relationship between polar angle and reflection light intensity at an azimuth angle of 180 degrees, where the line width of the basic figure is set to 3 μm in FIG. 11A, and 4 μm in FIG. 11B. The conditions for measurement are the same as those in the example 2. The film thickness of the protruding patterns 18 at the sides of the basic figure is 1.3 μm after being baked. The film thickness of the second insulation layer 19 is 1.5 μm, and the length of the sides of the basic figure is 24 μm on the average.

The reflection light intensity has a plurality of local maximum values, in each of the graphs shown in FIG. 11A and 11B. From FIG. 11A, it is known that the reflection light intensity reaches local maximum near the polar angle of 15 degrees in the case where the line width is 3 μm. On the other hand, it is known from FIG. 11B that the reflection light intensity reaches local maximum near the polar angle of 0 degree in addition to the polar angle of 15 degrees, in the case where the line width is 4 μm. Since the reflection light intensity reaches local maximum near the polar angle of 0 degree, it is turned out that the reflection light intensity at the polar angle of 0 degree is stronger, in the case where the line width is 4 μm.

EXAMPLE 3-2

Figure 12A:
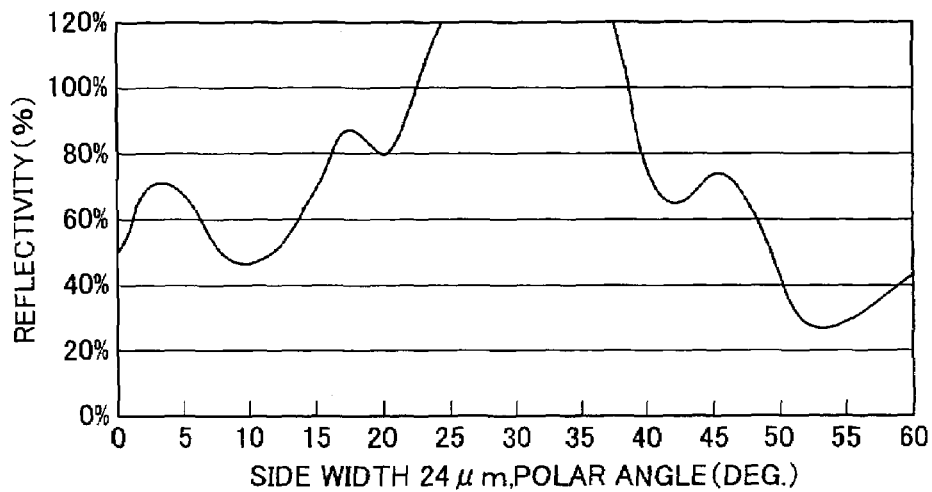
FIGS. 12A to 12C are graphs showing the relationship between polar angle and reflectivity in a case where length of side is varied.
Figure 12B:
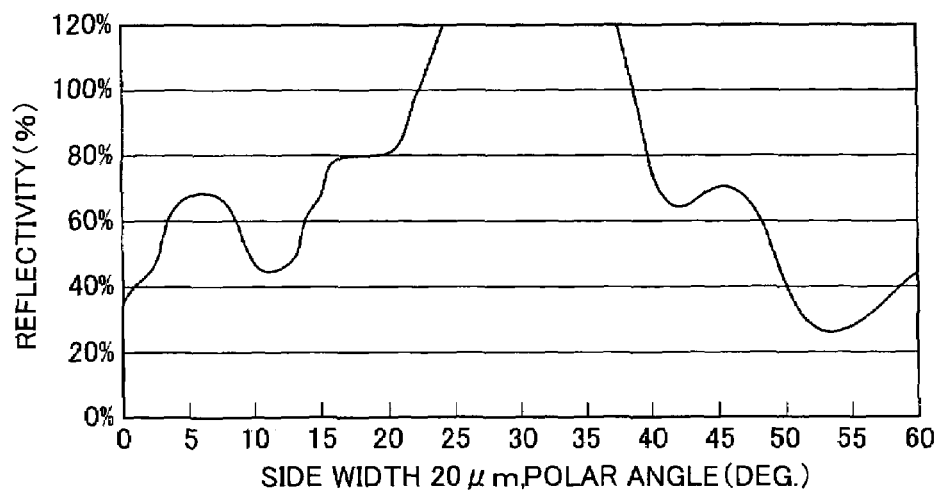
Figure 12C:
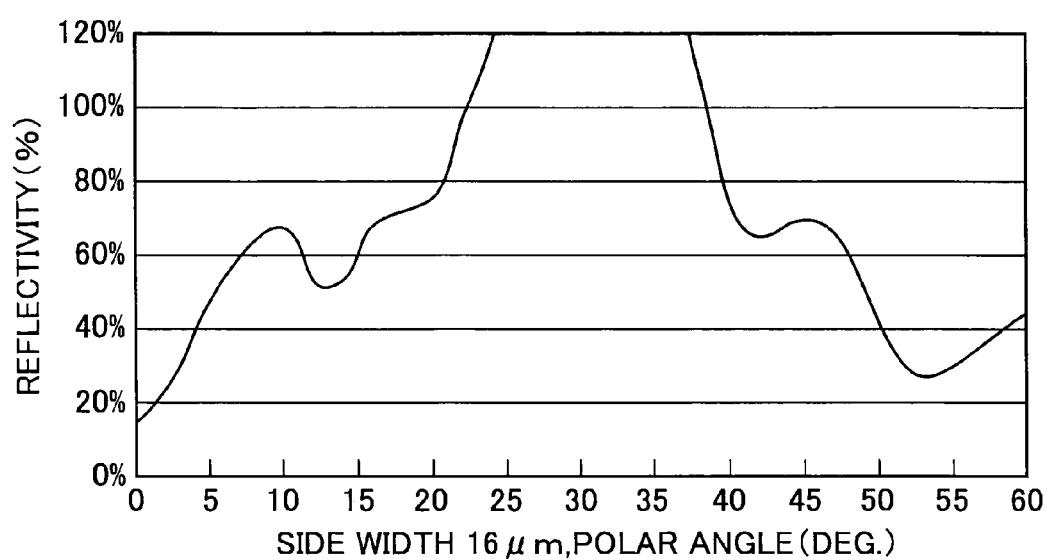
Figure 20:
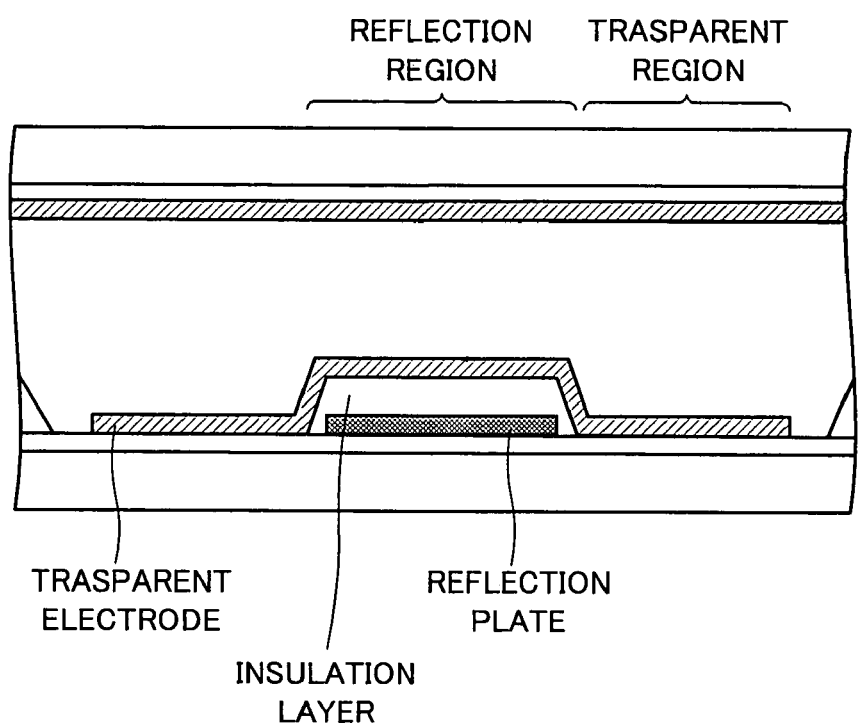
FIG. 20 shows a semi-transparent type liquid crystal display device according to the other embodiment of the invention.

FIGS. 12A to 12C respectively show results of measuring the relationship between polar angle and reflection light intensity, where the length of a side of a triangle (basic figure) is 24 μm in FIG. 12A, 20 μm in FIG. 12B, and 16 μm in FIG. 12C. The conditions for measurement are the same as those in the example 2. The film thickness of the protruding patterns 18 at the sides of the basic figure is 1.3 μm after being baked. The film thickness of the second insulation layer 19 is 1.5 μm, and the line width of the basic figure is 5 μm.

The reflection light intensity has a plurality of local maximum values, in each of the graphs shown in FIGS. 12A to 12C. By comparing FIGS. 12A to 12C, it is apparent that the larger the length of the side is, the polar angle, at which the local maximum of the reflection light intensity appears, becomes closer to 0 degree. That is, it is turned out that the larger the length of the side is, the stronger the reflection light intensity at the polar angle of 0 degree becomes.

EXAMPLE 3-3

Figure 14:
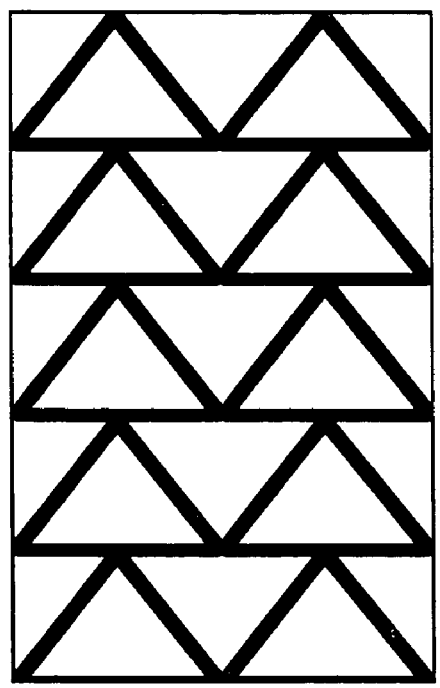
FIG. 14 shows a protruding pattern having an isosceles triangle basic figure.
Figure 13A:
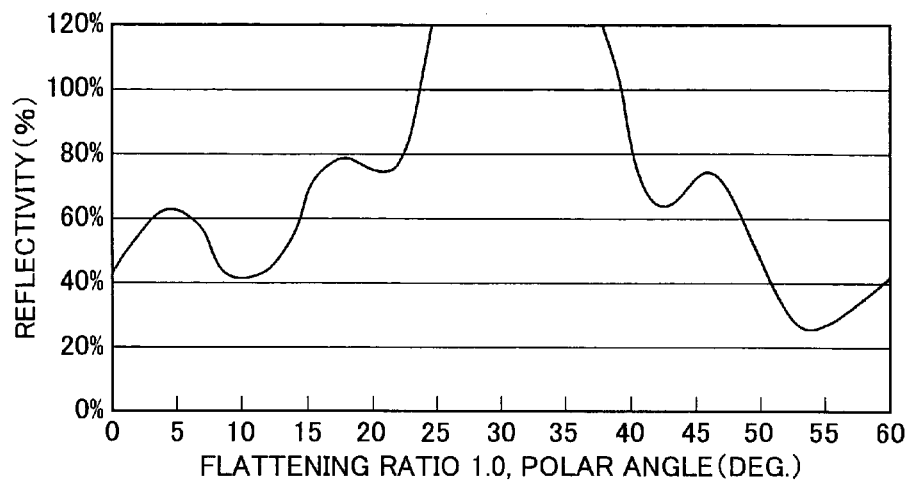
FIGS. 13A and 13B are graphs showing the relationship between polar angle and reflectivity in a case where flattening ratio is varied.
Figure 13B:
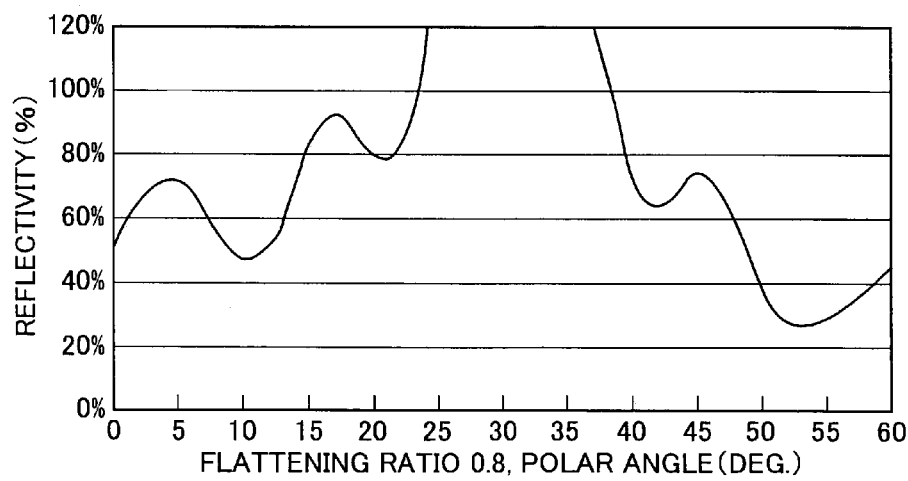

FIGS. 13A and 13B respectively show results of measuring the relationship between polar angle and reflection light intensity, where the flattening ratio of a triangle is 1.0 in FIG. 13A, and 0.8 in FIG. 13B. Here, it is defined that ratio between base and altitude of an equilateral triangle represents a flattening ratio of 1.0 (as illustrated in FIG. 8), and the ratio between base and altitude of an isosceles triangle having an altitude of 0.8 times as high as that of an isosceles triangle represents a flattening ratio of 0.8 (as illustrated in FIG. 14). The conditions for measurement are the same as those in the example 2. The film thickness of the protruding patterns 18 at the sides of the triangle is 1.3 µm after being baked. The film thickness of the second insulation layer 19 is 1.5 µm, the length of the sides of the triangle is 24 µm on the average, and the line width is 5 µm.

The reflection light intensity has a plurality of local maximum values, in each of the graphs shown in FIGS. 13A and 13B. By comparing FIGS. 13A and 13B, it is apparent that the reflection light intensity at the polar angle of 0 degree is stronger in a case where a triangle having a flattening ratio of 0.8 is formed, than in a case where a triangle having a flattening ratio of 1.0 is formed. As explained above, the reason for this result is considered to be that there are more line-shaped protruding patterns 18 that are arranged horizontally to the spectrophotometer within a specific area in the case of the flattening ratio of 0.8 than in the case of the flattening ratio of 1.0.

However, if the flattening ratio is less than 0.5, the reflection light might cause interference, and thus the characteristic of the reflection plate might be deteriorated. Therefore, it is found that the flattening ratio is preferably 0.5 to 0.8.

EXAMPLE 3-4

Figure 15A:
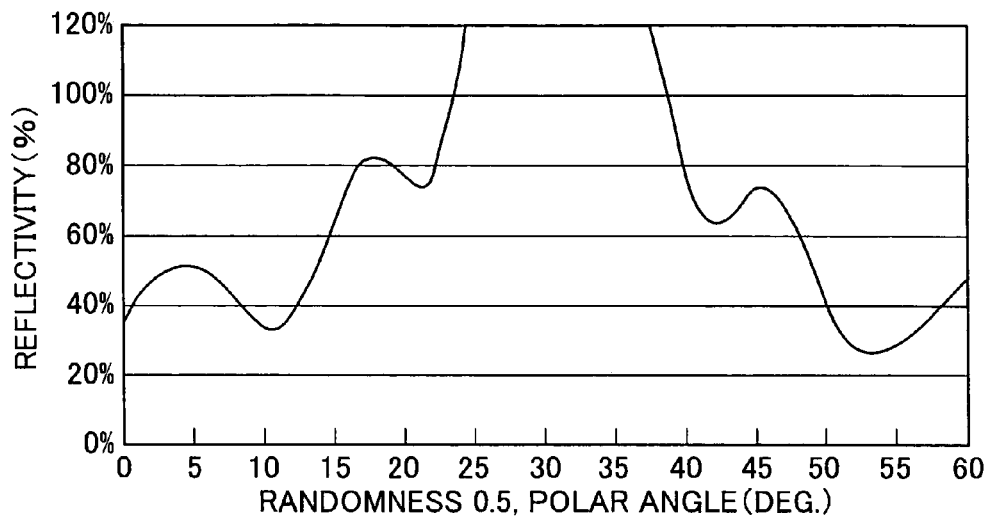
FIGS. 15A and 15B are graphs showing the relationship between polar angle and reflectivity in a case where randomness is varied.
Figure 15B:
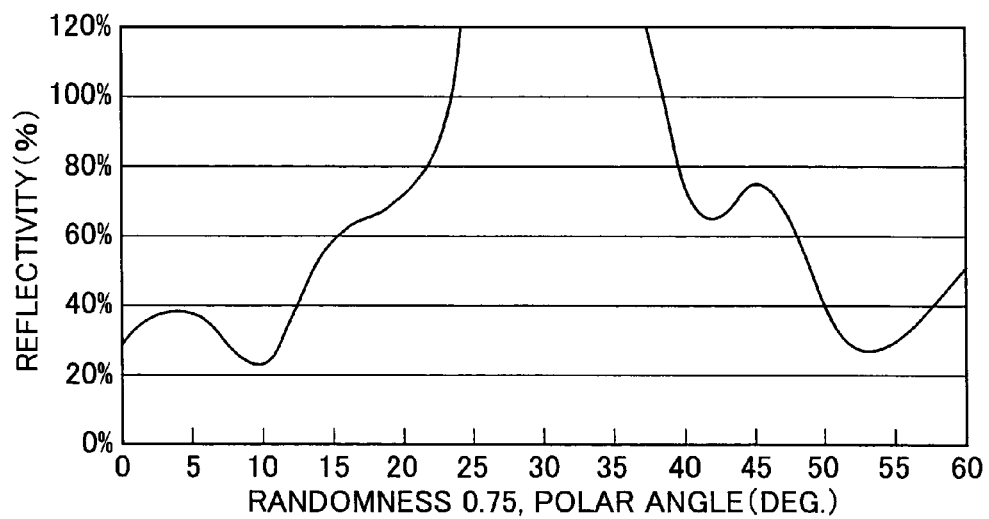

FIGS. 15A and 15B respectively show results of measuring the relationship between polar angle and reflection light intensity, where the randomness when arranging the basic figures is 0.5 in FIG. 15A, and 0.75 in FIG. 15B. Here, it is assumed that in a case where all the basic figures are arranged parallel to one another, this state is defined as having randomness of 0.0, while in a case where all the basic figures are arranged completely randomly, this state is defined as having randomness of 1.0. The conditions for measurement are the same as those in the example 2. The film thickness of the protruding patterns 18 at the sides of the basic figure is 1.3 µm after being baked. The film thickness of the second insulation layer 19 is 1.5 µm, the length of the sides of the basic figure is 24 µm on the average, and the line width is 5 µm.

The reflection light intensity has a plurality of local maximum values, in each of the graphs shown in FIGS. 15A and 15B. By comparing FIGS. 15A and 15B, it is apparent that the reflection light intensity at the polar angle of 0 degree is stronger in a case where the randomness is 0.5, than in a case where the randomness is 0.75. The reason for this result is considered to be that the number of the line-shaped protruding patterns 18 that are arranged horizontally to the spectrophotometer is smaller in a case where the randomness is large. However, if the randomness is reduced too much, the reflection light might cause interference, and thus the characteristic of the reflection plate might be deteriorated.

EXAMPLE 3-5

Figure 16A:
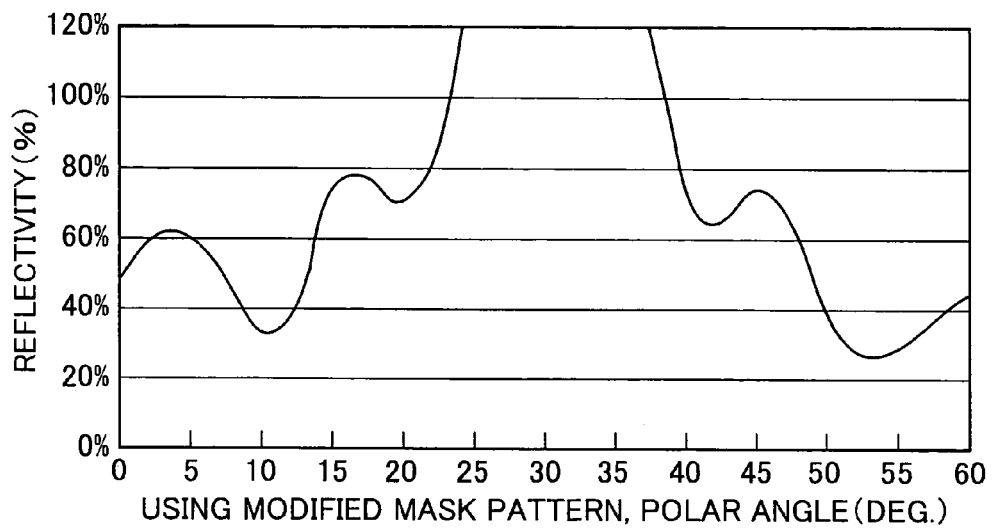
FIGS. 16A and 16B are graphs showing the relationship between polar angle and reflectivity in a case where different mask patterns are used.
Figure 16B:
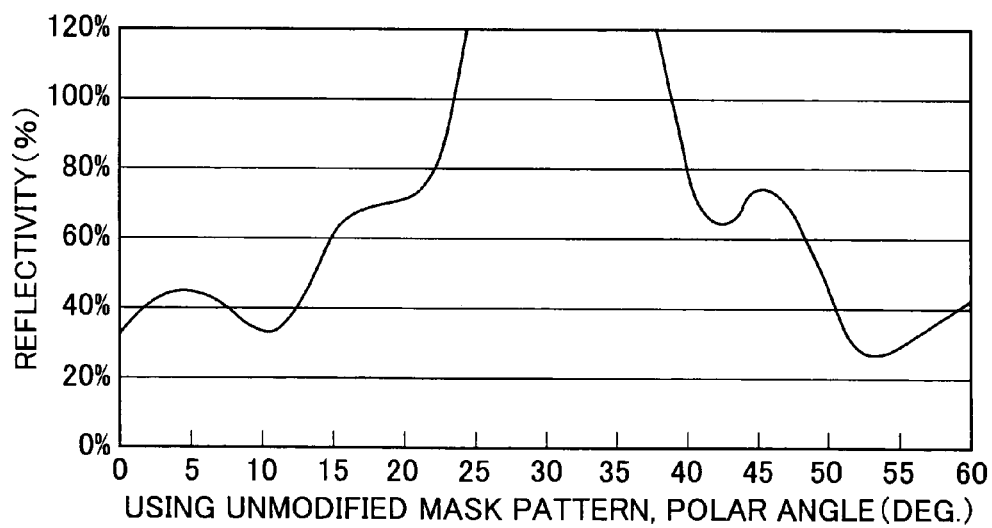

FIGS. 16A and 16B respectively show results of measuring the relationship between polar angle and reflection light intensity, where the modified mask pattern shown in FIG. 5B is applied to the vortexes of the basic figure in FIG. 16A, and the unmodified mask pattern shown in FIG. 5A is applied to the vertexes of the basic figure in FIG. 16B. The conditions for measurement are the same as those in the example 2. The film thickness of the protruding patterns 18 at the sides of the basic figure is 1.3 µm after being baked. The film thickness of the second insulation layer 19 is 1.5 µm, the length of the sides of the basic figure is 24 µm on the average, and the line width is 5 µm.

Figure 21:
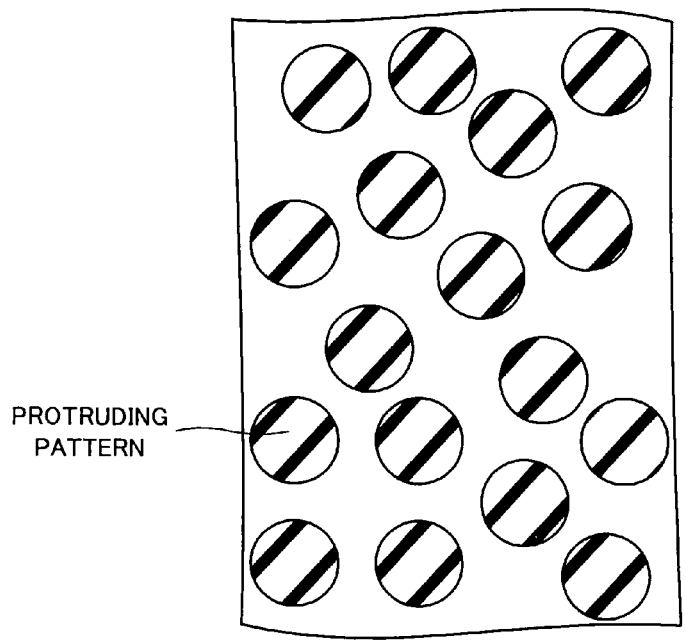
FIG. 21 is a plan view showing conventional protruding patterns.

The reflection light intensity has a plurality or local maximum values, in each of the graphs shown in FIGS. 16A and 16B. By comparing FIGS. 16A and 16B, it is apparent that the reflection light intensity at the polar angle of 0 degree is stronger in the case where the modified mask pattern shown in FIG. 5B is used, than in the case where the unmodified mask pattern is used. By narrowing the line width at the vertexes of the basic figure, the difference in height between the vertex and side portions of the protruding patterns 18 is reduced. Thus, it is considered that the shape of the vertexes is prevented from being circular as shown in FIG. 21, when viewed in a plan, and the directivity (anisotropy) of the reflection light intensity is enhanced toward the direction of azimuth angle.

EXAMPLE 3-6

Figure 17:
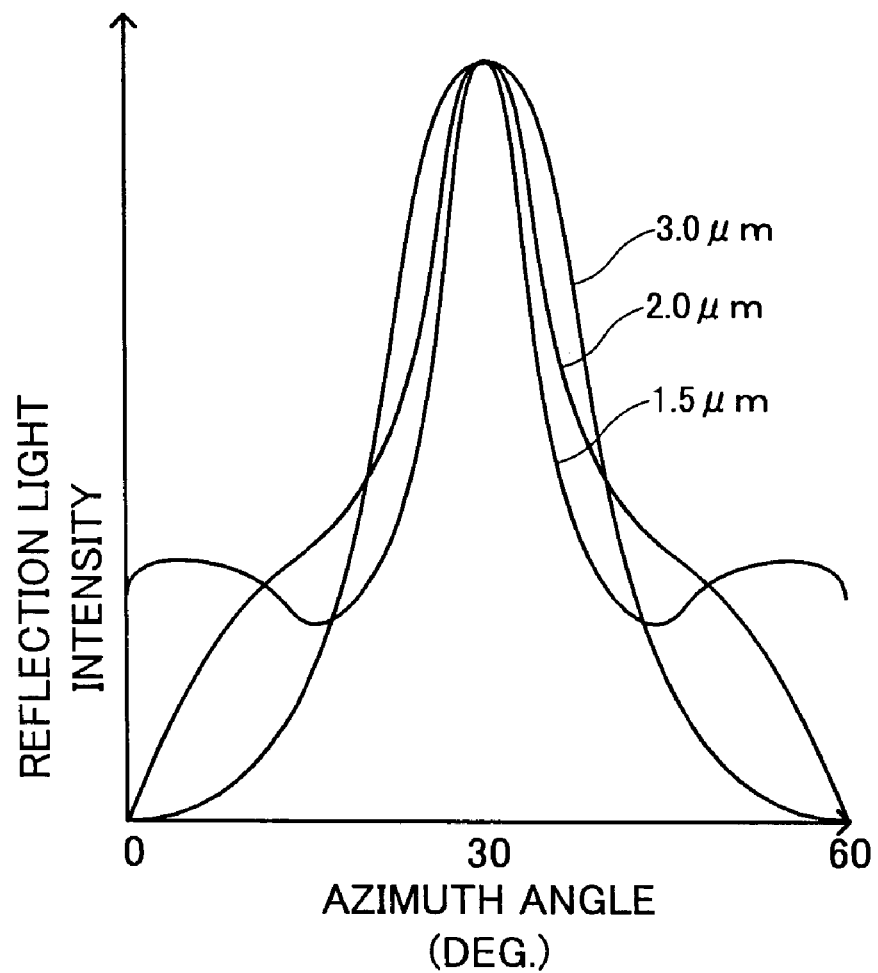
FIG. 17 is a graph showing the relationship between azimuth angle and reflectivity in a case where the thickness of the organic insulation layer is varied.

The relationship between polar angle and reflection light intensity will be considered by changing the thickness of the second insulation layer 19. The conditions for measurement are the same as those in the example 2. FIG. 17 shows the result when the coating thickness of the second insulation layer 19 is 1.5 µm, 2.0 µm or 3.0 µm, on the condition that the basic figure is a triangle, the flattening ratio is 0.8, the line width is 0.4 µm, the length of a side is 28 µm, the thickness of the protruding pattern 18 is 2.0 µm and the randomness is 0.75.

From FIG. 17, it is known that as the second insulation layer 19 becomes thicker, peak appearing near the azimuth angle of 0 degree shifts to near 20 degrees and finally disappears. It can be considered that this is because the sides of the triangles are flattened by the second insulation layer 19.

In the case where the thickness of the second insulation layer 19 is 1.5 µm, the reflection light intensity reaches local maximum near the polar angle of 0 to 10 degrees. Accordingly, when the display device is used in this range of angles, high reflectivity can be obtained if the reflection plate is designed in this way.

Also it is known that in the case where the thickness of the second insulation layer 19 is 2.0 µm, the change of the reflection light intensity has a positive slope in the range of polar angle of 10 to 20 degrees. And in the range of polar angle of 10 to A degrees (10<A<20), the slope of the change of the reflection light intensity becomes smaller, as the polar angle becomes larger. Further, in the range of polar angle of A to 20 degrees, the slope of the change of the reflection light intensity becomes larger, as the polar angle becomes larger. Accordingly, in the case where the display device is used in this range of polar angle, high reflectivity can be obtained if the reflection plate is designed in this way.

The same consideration will be made (not shown by data) by using three materials having different melting characteristics when being baked, as the material for the second insulation layer 19. From the result of the measurement, a material which has a poor melting characteristic and thus a poor tendency to change in its shape, achieves the strongest reflection light intensity at the polar angle of 0 degree.

As described in the above examples, the reflection light intensity is changed by the protruding patterns 18 which form the basic figure, in accordance with the azimuth angle. Therefore, it has been made sure that the alteration of the reflection light intensity in relation to the polar angle takes a plurality of local maximum values, and the reflection light intensity at the polar angle of 0 degree can be strengthened, if one of such local maximum values appears near the polar angle of 0 to 10 degrees. Thus, the lower substrate 11 (reflection plate) can increase the amount of light to be reflected toward the direction of 0-degree polar angle, i.e., toward the viewer, and thus can improve the contrast.

Specifically, by changing the line width, length of a side, and film thickness of the protruding patterns 18, and the film thickness of the second insulation layer 19, it is possible to form the protruding and concave portions, so as to maximize the anisotropy of the reflection plate and the reflection light intensity toward the normal line direction of the reflection plate. Further, by narrowing the line width of the line-shaped protruding patterns 18 at the intersections, it is possible to make the thickness of the protruding patterns 18 almost uniform. Thus, the difference in height between at the vertexes and at the sides of the basic figure can be reduced.

With the reduction of the difference in height, deterioration of light reflection efficiency due to projection of the protruding patterns 18 from the second insulation layer 19 can be prevented. Moreover, since the thickness of the second insulation layer 19 can freely be set to some extent, it is possible to select the thickness of the second insulation layer 19, so that the light reflection intensity toward the normal line direction (direction of 0-degree polar angle) can be strengthened.

Second Embodiment

Figure 18A:
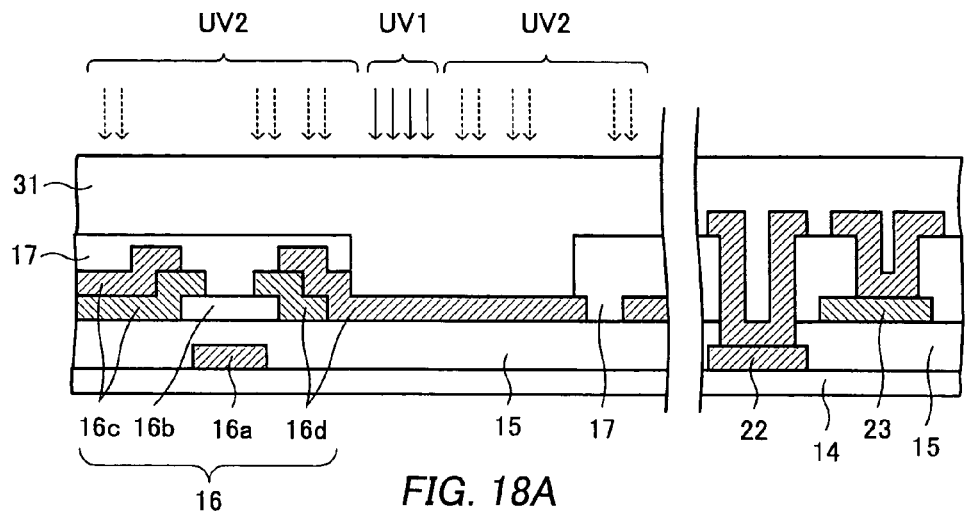
FIGS. 18A to 18C arc diagrams showing steps of manufacturing a lower substrate according to the second embodiment of the invention.
Figure 18B:
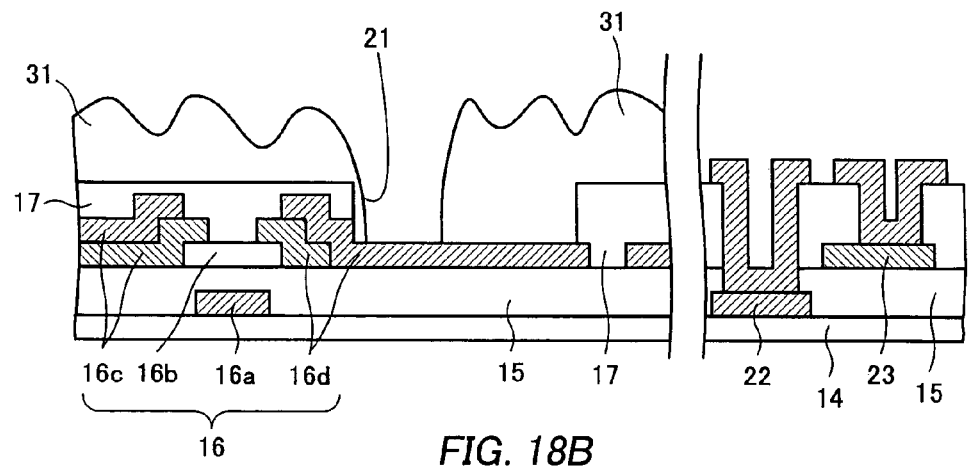
Figure 18C:
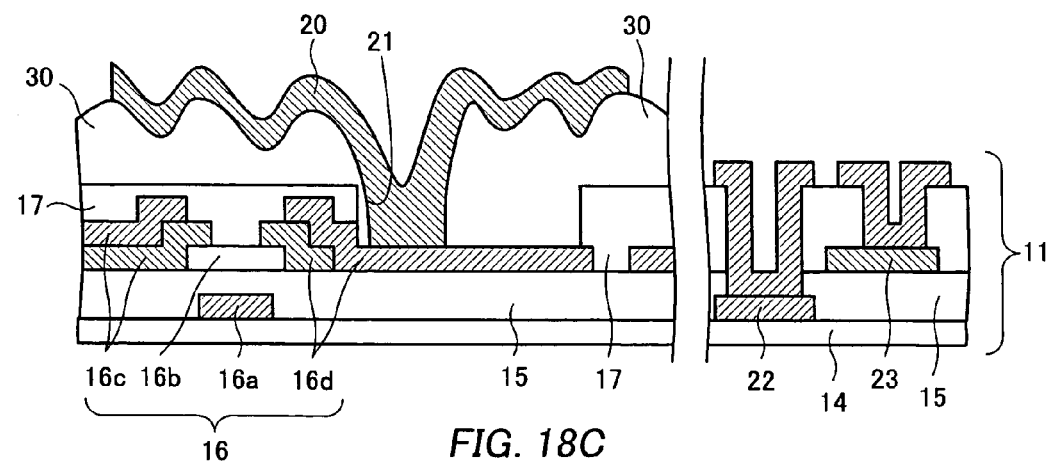

FIG. 18C shows the structure of a reflection plate (lower substrate 11) according to a second embodiment. The lower substrate 11 according to the second embodiment forms the wavy surface of the reflection electrode 20, by the waves formed on one interlayer insulation film 30, unlike the first embodiment.

The interlayer insulation film 30 is made of photosensitive resin, and its concave and protruding patterns are formed at the same time as the contact hole 21 is formed, by changing the luminous exposure of ultra violet rays (UV), as will be described later.

A method of manufacturing the lower substrate 11 according to the second embodiment will be explained below with reference to FIGS. 18A to 18C. This manufacturing method is disclosed in Unexamined Japanese Patent Application KOKAI Publication No. 2000-250025.

First, as shown in FIG. 18A, an organic resin layer 31 made of, for example, positive photosensitive resin is formed by coating on the first insulation layer 17 and the like in the state shown in FIG. 3B.

Then, the organic resin layer 31 is exposed and developed to form the contact hole 21, and at the same time, concave and protruding patterns are formed on the surface of the organic resin layer 31, as shown in FIG. 18B. That is, the area where the contact hole 21 is formed, and the areas where the concave and protruding patterns are formed, are exposed by using different masks and by different luminous exposures. Preferably, the luminous exposure (UV1) for the areas for the concave and protruding patterns is 10 to 50% of the luminous exposure (UV2) of the area for the contact hole.

The dissolution speed of a positive photosensitive resin depends largely upon the decomposition ratio of a photosensitive agent. Using this characteristic, by changing the decomposition ratios for the areas for the concave and protruding patterns and the area for the contact hole, it is possible to generate a difference in dissolution speed between the resins of the both areas. Accordingly, it is possible to form the deep contact hole 21 and the shallow patterns, by developing the organic resin layer 31 during a period of time enough to dissolve (resolve) the layer to form the contact hole 21.

Patterning of the organic resin layer 31 may be carried out by using a same mask, if the mask is a so called half tone mask, that is, if the mask has different light transmittance for the area for the contact hole 21, and the areas for the concave and protruding patterns.

After the organic resin layer 31 is patterned, it is baked to form an interlayer insulation film 30. Then, a metal film made of aluminum or the like is formed, and then patterned. Thus, a reflection electrode 20 is formed. As a result, the lower substrate 11 shown in FIG. 18C is completed.

Figure 19:
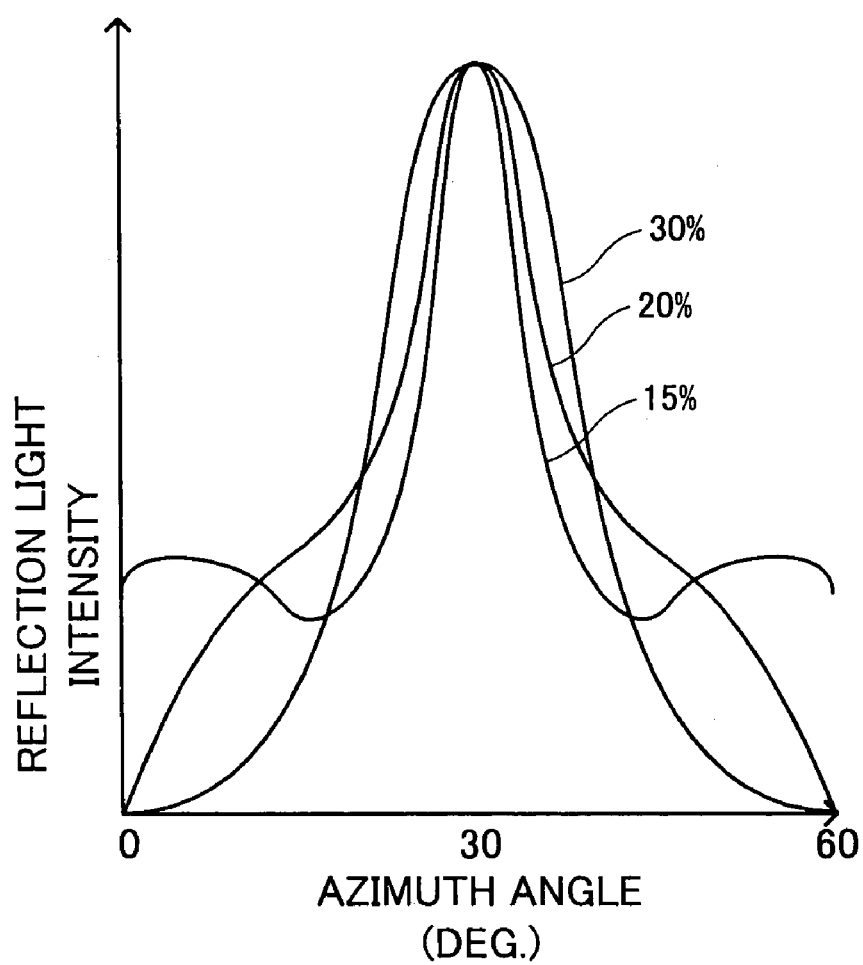
FIG. 19 is a graph showing the relationship between azimuth angle and reflectivity in a case where luminous exposure is varied.

FIG. 19 shows results obtained when the film thickness of the organic resin layer 31 is unchanged, and the luminous exposure for the areas for the concave and protruding patterns is set to 25%, 20%, and 15% of the luminous exposure of the area for the contact hole. The conditions for measurement are the same as those in the above example 3–6.

As known from FIG. 19, as the luminous exposure is reduced, the peak of the reflection light intensity near the 0 degree angle shifts to near the 20 degree angle, and at last disappears. This may be because the sides of the triangles are flattened by the interlayer insulation film 30.

When the luminous exposure is 25% of that of the contact hole area, the reflection light intensity reaches local maximum near the polar angle of 0 to 10 degrees. Accordingly, if the display device is used in this range of polar angle, high reflectivity can be obtained if the lower substrate is designed as described above.

When the luminous exposure is 20% of that of the contact hole area, the change of the reflection light intensity has a positive slope in the range of polar angle of 10 to 20 degrees. And in the range of polar angle of 10 to A degrees (10<A<20), the slope of the change of the reflection light intensity becomes smaller, as the polar angle becomes larger. Further, in the range of polar angle of A to 20 degrees, the slope of the change of the reflection light intensity becomes larger, as the polar angle becomes larger. Accordingly, if the display device is used in this range of polar angle, high reflectivity can be obtained if the lower substrate is designed as described above.

As explained, the reflection plate having the concave and protruding patterns according to the first and second embodiments achieves reflection light intensity which is dependent upon azimuth angle. And the change of the reflection light intensity in relation to the polar angle shows a plurality of local maximum values. High reflection light intensity at the polar angle of 0 degree is realized when the local maximum appears near the polar angle of 0 to 10 degrees.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

In the above described embodiments, examples where the present invention is applied to a reflection type liquid crystal display device, are explained. However, the present invention can be applied to a so-called semi-transparent type liquid crystal display device, as disclosed in Japanese Patent No. 2955277. For example, the present invention can be applied to a liquid crystal display device shown in FIG. 20, which comprises a transparent electrode including a transparent region and a reflection region, and a reflection plate, and thus has the function of a transparent liquid crystal display device and the function of a reflection type liquid crystal display device.

This application is based on Japanese Patent Application No. 2001-190264 filed on Jun. 22, 2001 and including specification, claims, drawings and summary. The disclosure of the above Japanese Patent Application is incorporated herein by reference in its entirety.

What is claimed is:

1. A mask for forming a reflection plate for a liquid crystal display, the mask comprising plural line-shaped protrusion forming portions, said line-shaped protrusion forming portions meeting at intersections to define closed concave forming portions, each of said line-shaped protrusion forming portions having a uniform width except at said intersections where said line-shaped protrusion forming portions are narrower than said uniform width.

2. The mask of claim 1, wherein said closed concave forming portions are polygons.

3. The mask of claim 1, wherein a combined height of said line-shaped protrusion forming portions at said intersections is the same as a height of one of said line-shaped protrusion forming portions.

4. A mask for forming a reflection plate for a liquid crystal display, the mask comprising plural line-shaped protrusion forming portions, said line-shaped protrusion forming portions meeting at intersections to define closed concave forming portions, each of said line-shaped protrusion forming portions having a width at said intersections that is less than the width of said line-shaped protrusion forming portions between said intersections.

5. The mask of claim 4, wherein said closed concave, portions are polygons.

6. The mask of claim 4, wherein a combined height of said line-shaped protruding portions at said intersections is the same as a height of one of said line-shaped protruding portions.

* * * * *